US012593346B2

(12) United States Patent
Abotabl et al.

(10) Patent No.: US 12,593,346 B2
(45) Date of Patent: Mar. 31, 2026

(54) UPLINK INDICATION FOR FULL-DUPLEX OPERATION

(71) Applicant: QUALCOMM Incorporated, San Diego, CA (US)

(72) Inventors: Ahmed Attia Abotabl, San Diego, CA (US); Wanshi Chen, San Diego, CA (US); Muhammad Sayed Khairy Abdelghaffar, San Jose, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 17/185,400

(22) Filed: Feb. 25, 2021

(65) Prior Publication Data

US 2021/0298026 A1    Sep. 23, 2021

Related U.S. Application Data

(60) Provisional application No. 62/991,877, filed on Mar. 19, 2020.

(51) Int. Cl.
*H04W 72/53*      (2023.01)
*H04L 1/00*       (2006.01)
(Continued)

(52) U.S. Cl.
CPC ........... *H04W 72/53* (2023.01); *H04L 1/0068* (2013.01); *H04L 1/1614* (2013.01); *H04L 5/14* (2013.01);
(Continued)

(58) Field of Classification Search
CPC ......... H04W 72/0453; H04W 72/0446; H04W 72/042; H04W 72/0493; H04L 1/0068;
(Continued)

(56) References Cited

U.S. PATENT DOCUMENTS

2015/0334702 A1* 11/2015 Ji ...................... H04W 72/0453
                                                                370/280
2016/0330011 A1    11/2016 Lee et al.
(Continued)

FOREIGN PATENT DOCUMENTS

CN        104521265 A     4/2015
CN        110463311 A     11/2019
WO    WO-2019050544 A1    3/2019

OTHER PUBLICATIONS

CATT: "Power Saving Scheme with Cross-Slot Scheduling", 3GPP Draft, R1-1912180, 3GPP TSG RAN WG1 Meeting #99, 3rd Generation Partnership Project (3GPP), Mobile Competence Centre, 650, Route Des Lucioles, F-06921 Sophia-Antipolis Cedex, France, vol. RAN WG1. No. Reno. USA, Nov. 18, 2019-Nov. 22, 2019, Nov. 9, 2019 (Nov. 9, 2019), XP051823258, pp. 1-4, Retrieved from the Internet: URL:https://ftp.3gpp.org/tsg_ran/WG1_RL1/TSGR1_99/Docs/R1-1912180.zip [retrieved on Nov. 9, 2019] Section 2.1, Figure 1(b).

(Continued)

*Primary Examiner* — Huy D Vu
*Assistant Examiner* — Bao G Nguyen
(74) *Attorney, Agent, or Firm* — Holland & Hart LLP

(57)                ABSTRACT

Methods, systems, and devices for wireless communications are described. In some systems, a user equipment (UE) and a base station may operate in a network that supports full-duplex communications. The UE may receive downlink communication and transmit uplink communication simultaneously and, in some cases, the uplink communication may cause self-interference that may adversely affect the reception of the downlink communication. The UE may receive, from the base station, an indication of the time or frequency resources over which the uplink communication overlaps in time with the downlink communication and may select a decoding technique to use for decoding the down- (Continued)

link transmission based on the indication. The UE may also receive, from the base station, a rate-matching configuration or puncturing information associated with the downlink transmission, which the UE may additionally use in selecting the decoding technique.

28 Claims, 21 Drawing Sheets

(51) Int. Cl.

| | |
|---|---|
| *H04L 1/1607* | (2023.01) |
| *H04L 5/14* | (2006.01) |
| *H04W 72/0446* | (2023.01) |
| *H04W 72/0453* | (2023.01) |
| *H04W 72/23* | (2023.01) |

(52) U.S. Cl.
CPC ... *H04W 72/0446* (2013.01); *H04W 72/0453* (2013.01); *H04W 72/23* (2023.01)

(58) Field of Classification Search
CPC ....... H04L 1/1812; H04L 5/14; H04L 5/0094; H04L 1/1614; H04L 5/0042
See application file for complete search history.

(56) References Cited

U.S. PATENT DOCUMENTS

| | | | |
|---|---|---|---|
| 2018/0123759 A1* | 5/2018 | Zhang | H04B 7/04 |
| 2019/0116018 A1 | 4/2019 | Aboul-Magd et al. | |
| 2019/0190685 A1* | 6/2019 | Xia | H04L 5/143 |
| 2019/0342062 A1 | 11/2019 | Ren et al. | |
| 2019/0394757 A1* | 12/2019 | Zhang | H04B 7/0456 |
| 2020/0205133 A1* | 6/2020 | Takeda | H04L 5/0094 |
| 2021/0058221 A1* | 2/2021 | Taneja | H04L 5/14 |
| 2021/0176033 A1* | 6/2021 | Oteri | H04W 74/0816 |
| 2021/0360672 A1* | 11/2021 | Kim | H04L 5/0035 |
| 2021/0392625 A1* | 12/2021 | Lin | H04W 72/23 |
| 2022/0030604 A1* | 1/2022 | Noh | H04W 72/04 |
| 2022/0046672 A1* | 2/2022 | Yuan | H04W 72/1268 |
| 2022/0377784 A1* | 11/2022 | Matsumura | H04L 5/0044 |
| 2023/0080106 A1* | 3/2023 | Ji | H04L 5/0094 |
| | | | 370/330 |

OTHER PUBLICATIONS

International Search Report and Written Opinion—PCT/US2021/019932—ISA/EPO—Jun. 8, 2021.

* cited by examiner

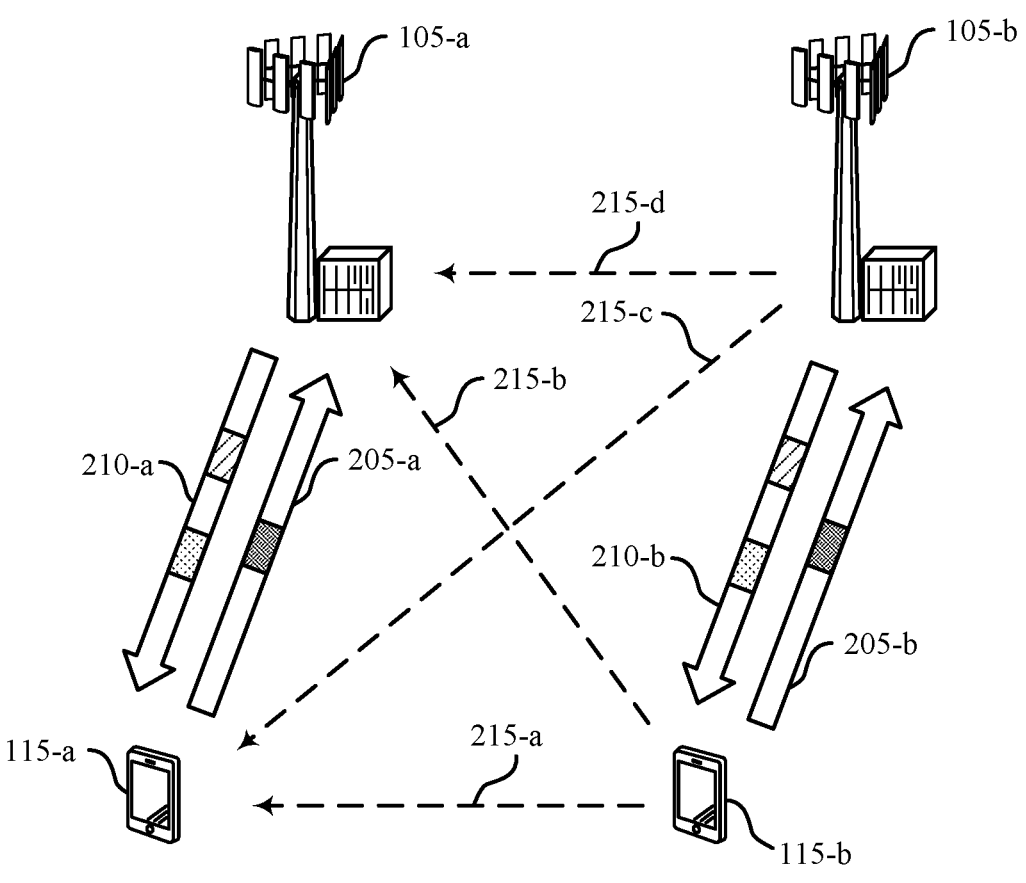
105-a
105-b
215-d
215-c
215-b
210-a
205-a
210-b
205-b
215-a
115-a
115-b
Uplink Transmission 220
Downlink Transmission 225
Uplink Indication 230
200
FIG. 2

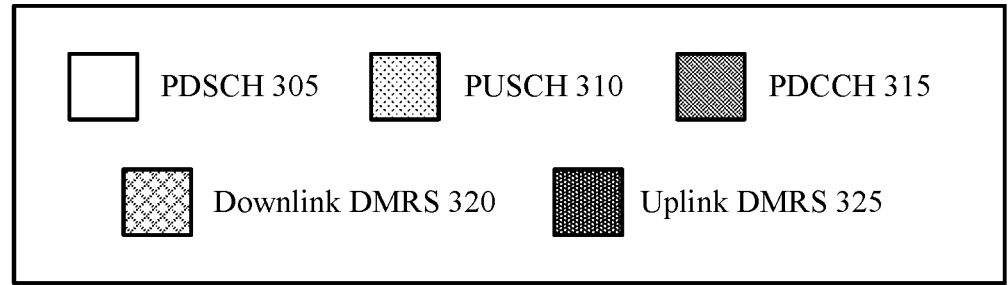
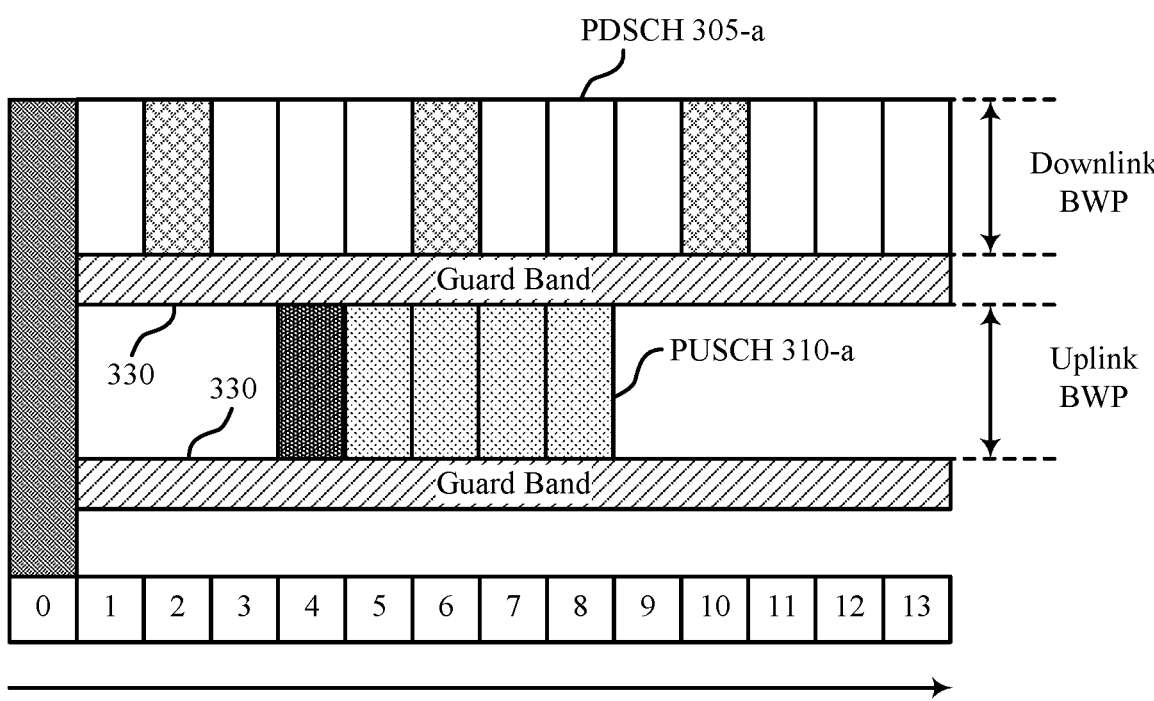
FIG. 3

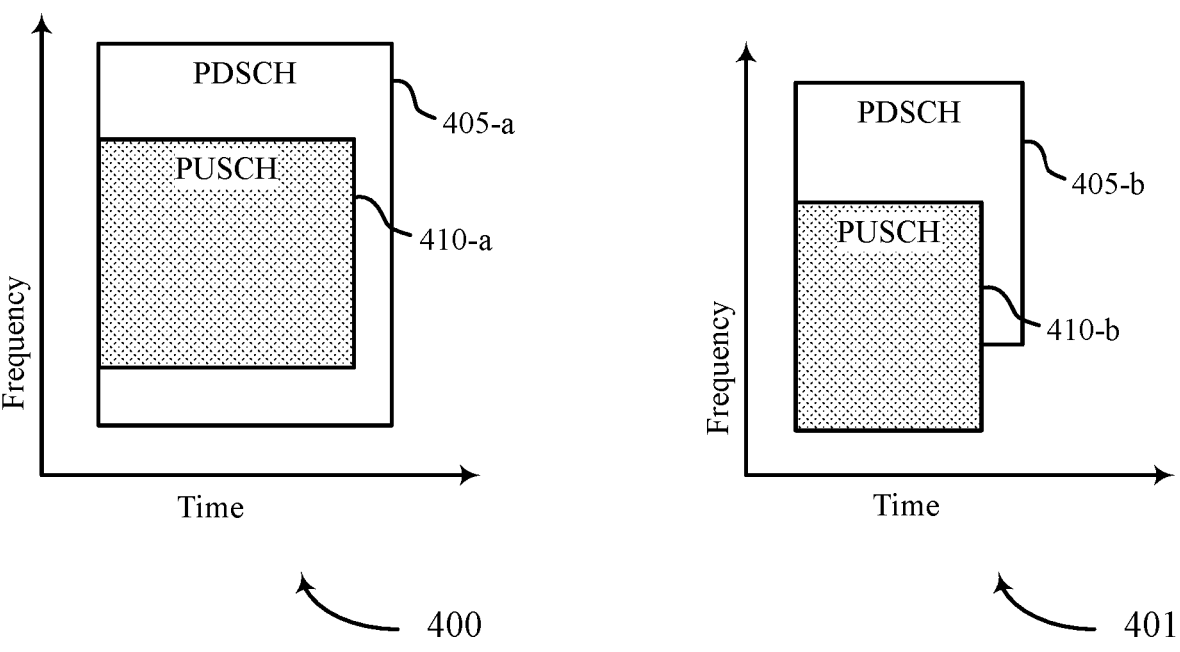
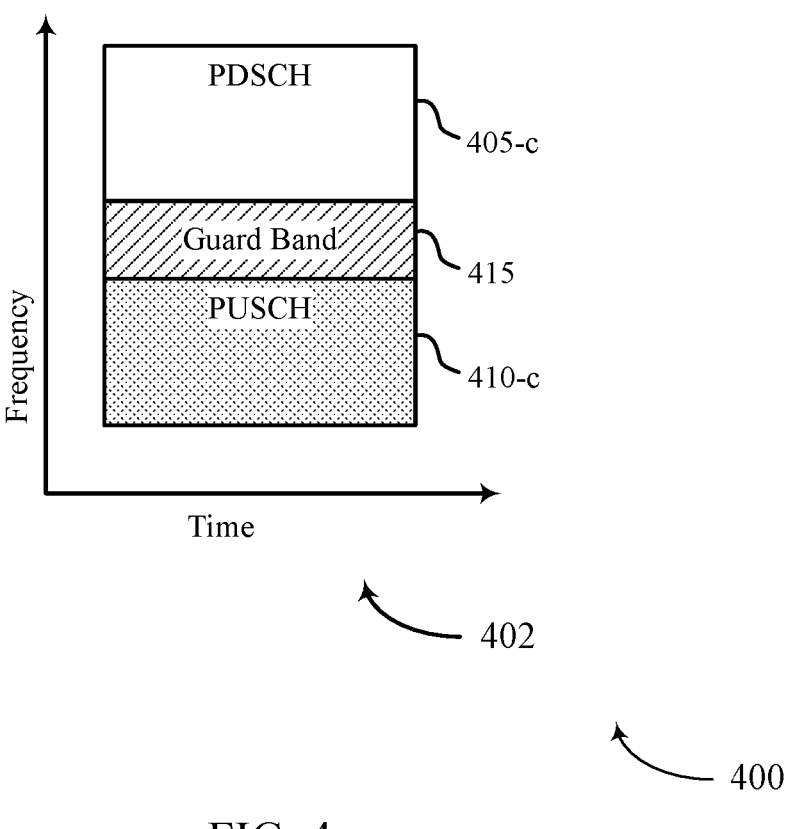
FIG. 4

610

615

620

605

600

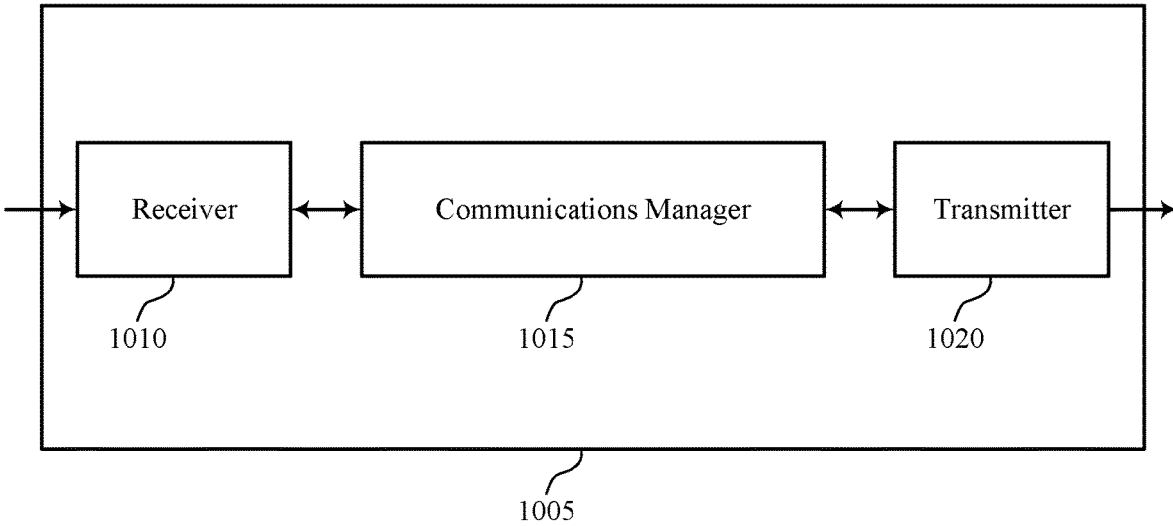
1010           1015           1020
1005
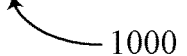
FIG. 10

Identify that the UE is operating in a network that supports full-duplex communications

1405

Receive, from a base station in the network, an indication of time or frequency resources in which an uplink communication to the base station overlaps in time with a downlink communication to the UE

1410

Decode the downlink communication based on the indication

1415

1400

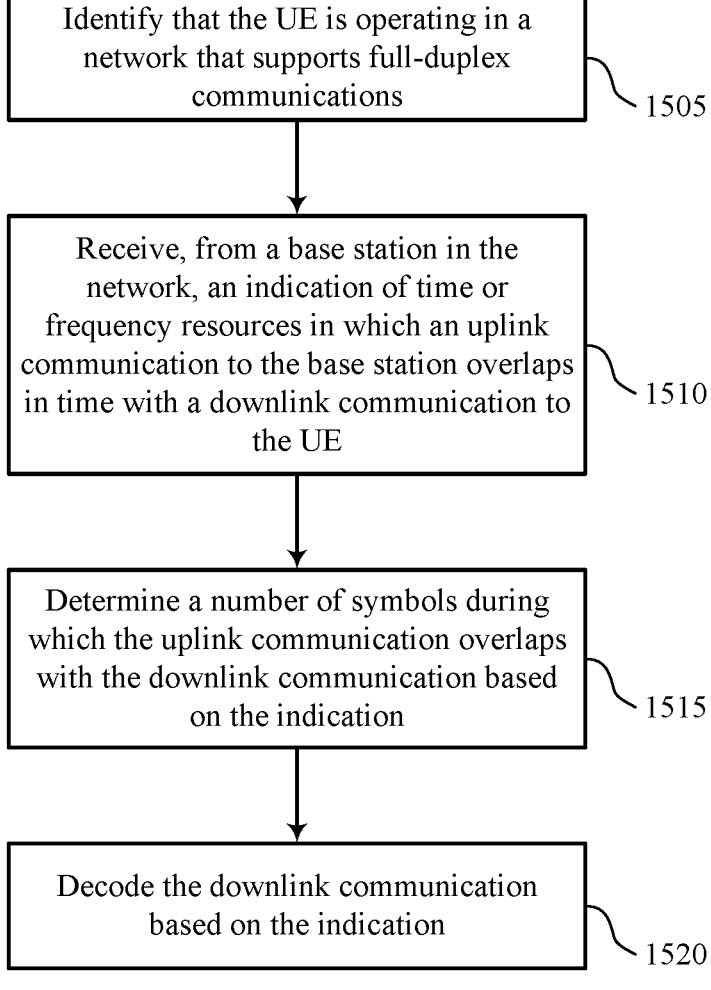

Identify that the UE is operating in a
network that supports full-duplex
communications

1505

Receive, from a base station in the
network, an indication of time or
frequency resources in which an uplink
communication to the base station overlaps
in time with a downlink communication to
the UE

1510

Determine a number of symbols during
which the uplink communication overlaps
with the downlink communication based
on the indication

1515

Decode the downlink communication
based on the indication

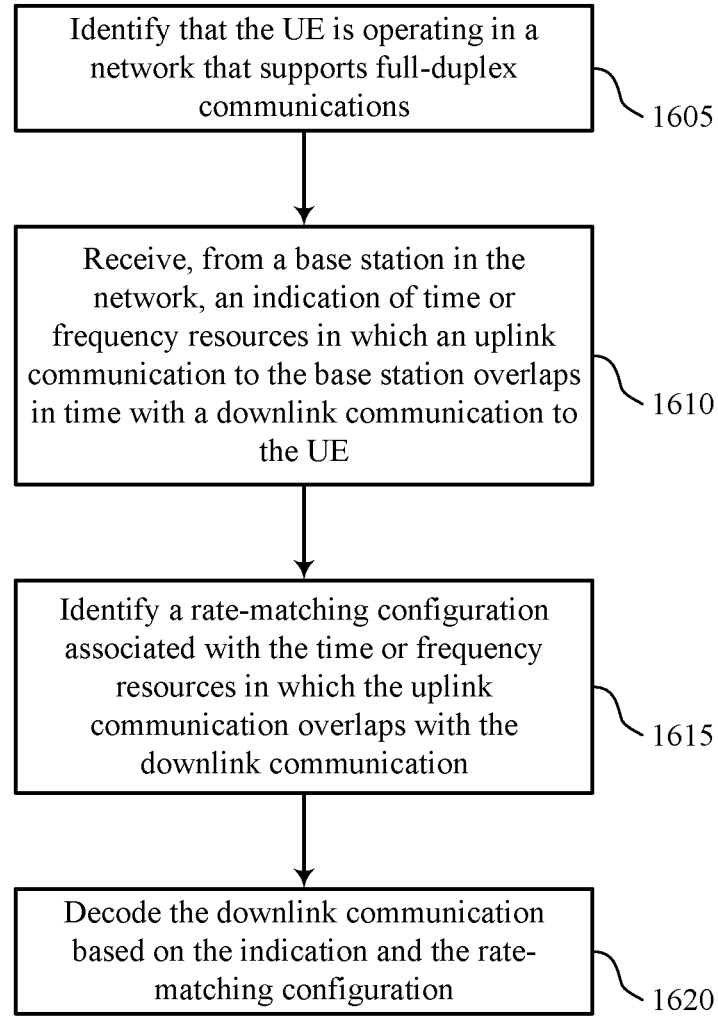

Identify that the UE is operating in a network that supports full-duplex communications

1605

Receive, from a base station in the network, an indication of time or frequency resources in which an uplink communication to the base station overlaps in time with a downlink communication to the UE

1610

Identify a rate-matching configuration associated with the time or frequency resources in which the uplink communication overlaps with the downlink communication

1615

Decode the downlink communication based on the indication and the rate-matching configuration

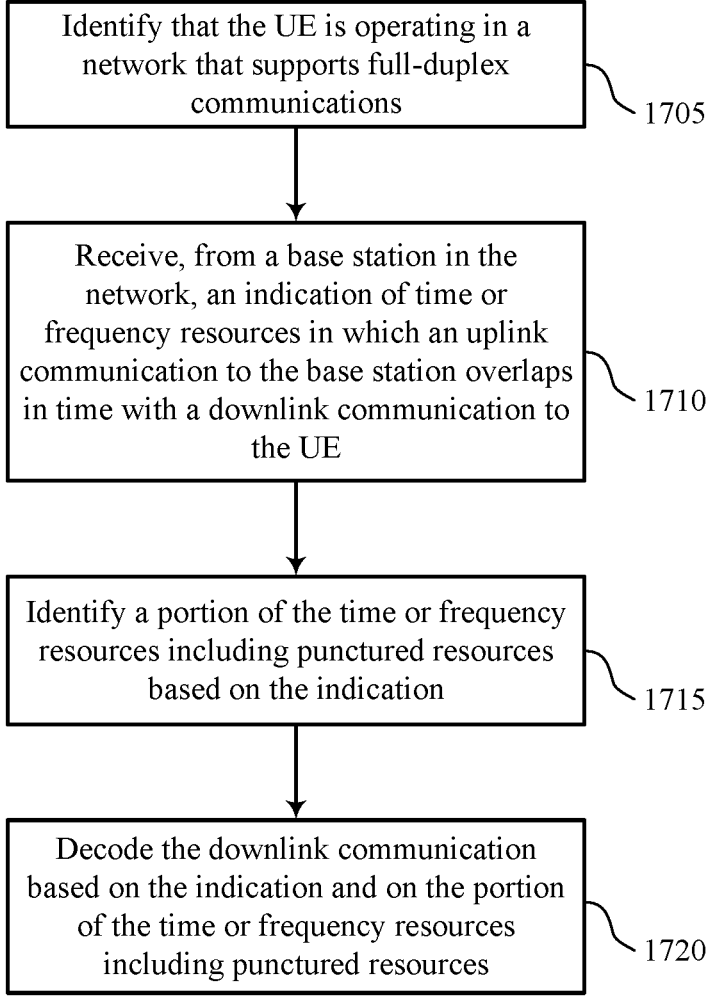

Identify that the UE is operating in a network that supports full-duplex communications

1705

Receive, from a base station in the network, an indication of time or frequency resources in which an uplink communication to the base station overlaps in time with a downlink communication to the UE

1710

Identify a portion of the time or frequency resources including punctured resources based on the indication

1715

Decode the downlink communication based on the indication and on the portion of the time or frequency resources including punctured resources

Identify that the base station is operating in a network that supports full-duplex communications

1805

Determine time or frequency resources in which an uplink communication to the base station overlaps in time with a downlink communication to a UE in the network

1810

Transmit, to the UE, an indication of the time or frequency resources

1815

1800

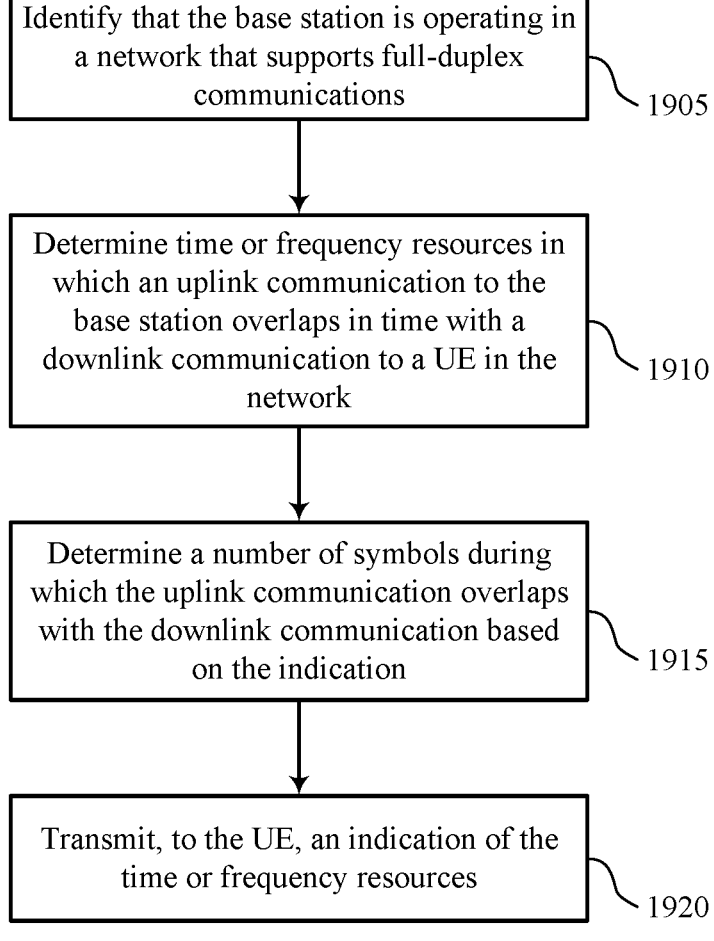

Identify that the base station is operating in a network that supports full-duplex communications ⟍ 1905

Determine time or frequency resources in which an uplink communication to the base station overlaps in time with a downlink communication to a UE in the network ⟍ 1910

Determine a number of symbols during which the uplink communication overlaps with the downlink communication based on the indication ⟍ 1915

Transmit, to the UE, an indication of the time or frequency resources ⟍ 1920

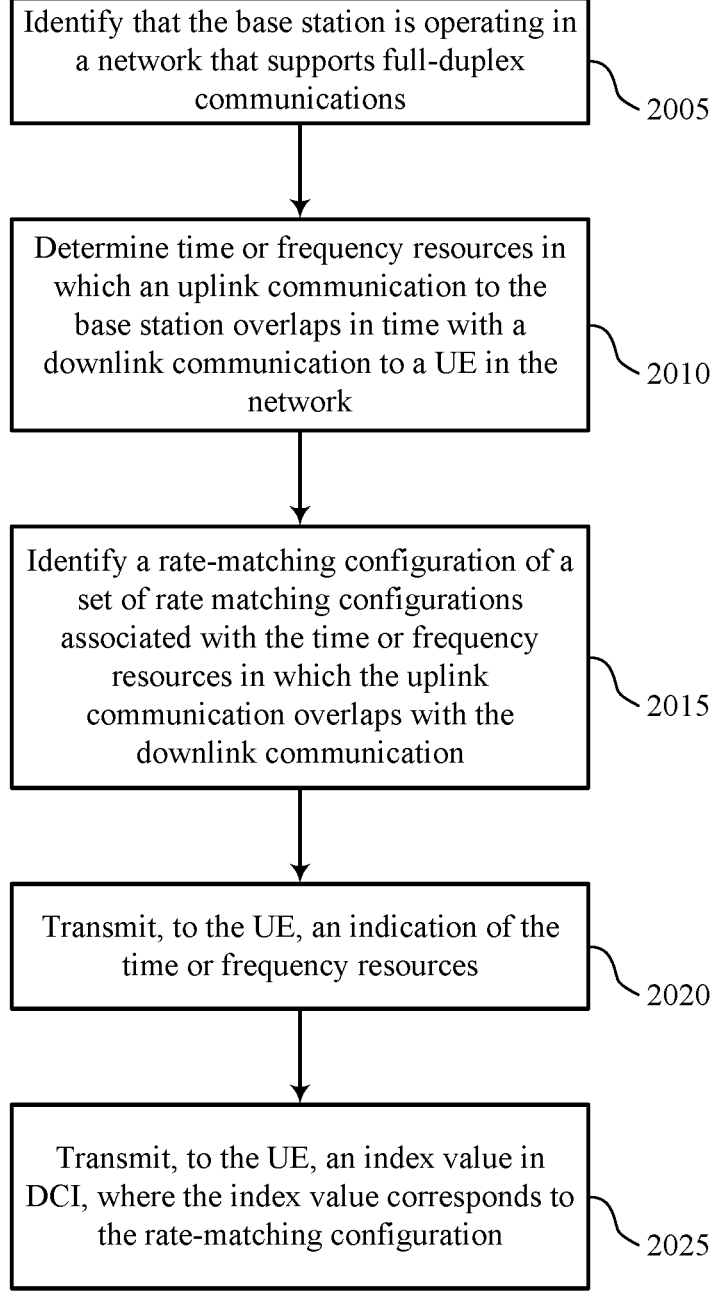

Identify that the base station is operating in a network that supports full-duplex communications

2005

Determine time or frequency resources in which an uplink communication to the base station overlaps in time with a downlink communication to a UE in the network

2010

Identify a rate-matching configuration of a set of rate matching configurations associated with the time or frequency resources in which the uplink communication overlaps with the downlink communication

2015

Transmit, to the UE, an indication of the time or frequency resources

2020

Transmit, to the UE, an index value in DCI, where the index value corresponds to the rate-matching configuration

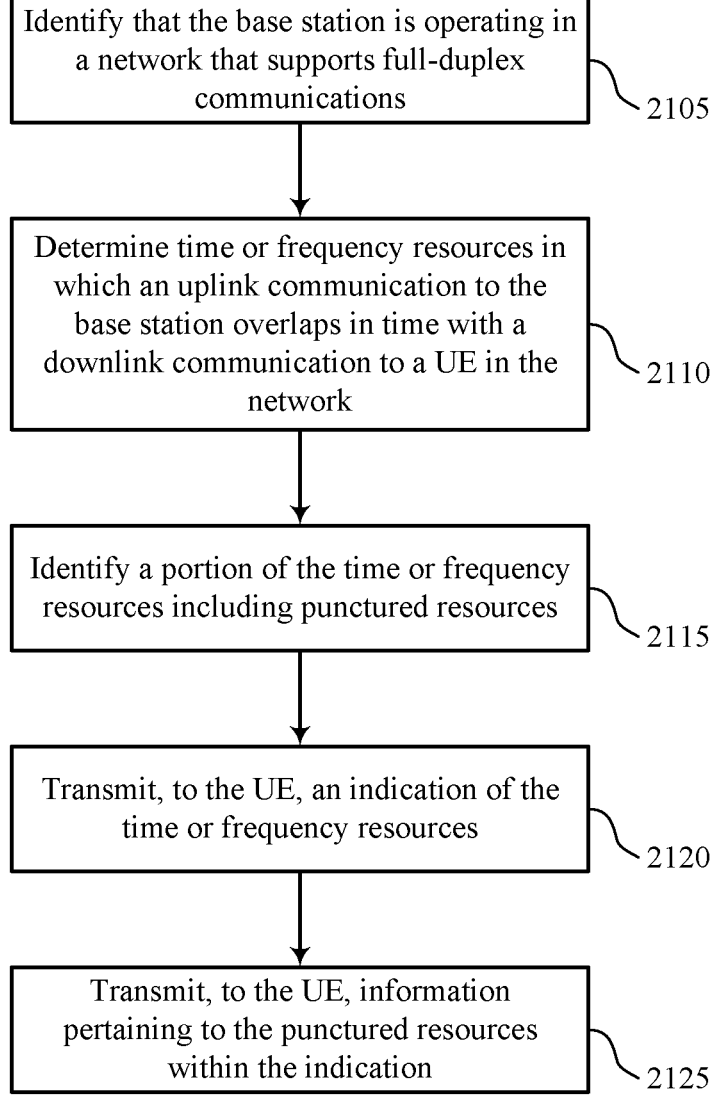

Identify that the base station is operating in a network that supports full-duplex communications
2105

Determine time or frequency resources in which an uplink communication to the base station overlaps in time with a downlink communication to a UE in the network
2110

Identify a portion of the time or frequency resources including punctured resources
2115

Transmit, to the UE, an indication of the time or frequency resources
2120

Transmit, to the UE, information pertaining to the punctured resources within the indication
2125

UPLINK INDICATION FOR FULL-DUPLEX OPERATION

CROSS REFERENCE

The present Application for Patent claims the benefit of U.S. Provisional Patent Application No. 62/991,877 by ABOTABL et al., entitled "UPLINK INDICATION FOR FULL-DUPLEX OPERATION," filed Mar. 19, 2020, assigned to the assignee hereof, and expressly incorporated by reference herein.

FIELD OF TECHNOLOGY

The following relates generally to wireless communications and more specifically to an uplink indication for full-duplex operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support UEs or base stations that are capable of full-duplex communications (e.g., simultaneously transmitting and receiving). In some cases, full-duplex wireless devices may be affected by interference from the device's own transmission and reception of signals, which may sometimes be referred to as self-interference. In particular, while a UE is receiving on a downlink, the receive antennas of the UE may be affected by interference from signals sent on an uplink by the same UE. In other cases, a full-duplex base station may transmit on the downlink to one or more UEs, which may contribute some level of interference to uplink signals that are received at the base station while the base station is transmitting. As such, improved techniques may be desirable to enhance communications efficiency and reduce the influence of self-interference affecting full-duplex wireless devices.

SUMMARY

The described techniques relate to improved methods, systems, devices, and apparatuses that support uplink indication for full-duplex operation. Generally, the described techniques provide for receiving an indication, at a user equipment (UE), of resources over which uplink communications to a base station may overlap in time with downlink communications to the UE. For example, the UE, based on receiving the indication, may identify that a downlink transmission from the base station is received at the same time as an uplink transmission is transmitted to the base station. As such, the UE may determine that the downlink transmission was received at a time when interference from the uplink transmission was likely and the UE may decode the downlink transmission based on (e.g., accounting for) the interference that likely affected the reception of the downlink transmission. For instance, the UE may select or otherwise determine a decoding technique based on determining that the downlink transmission was likely received in a high-interference environment. Further, the UE may receive, from the base station, a rate-matching configuration or puncturing information, or both, associated with the downlink transmission, which the UE may additionally use to select or otherwise determine a decoding technique for the downlink transmission.

The base station may transmit the uplink indication to the UE in downlink control information (DCI). In some examples, the base station may provide the uplink indication in a same DCI that the base station uses to schedule the downlink transmission or the uplink transmission. In some other examples, the base station may provide the uplink indication in a different DCI than the DCI used to schedule the downlink transmission or the uplink transmission. In some implementations, the UE may monitor for the uplink indication based on an identifier associated with the uplink indication and may receive the uplink indication in a common search space (CSS) set.

A method of wireless communication at a UE is described. The method may include identifying that the UE is operating in a network that supports full-duplex communications, receiving, from a base station in the network, an indication of time or frequency resources in which an uplink communication to the base station overlaps in time with a downlink communication to the UE, and decoding the downlink communication based on the indication.

An apparatus for wireless communication is described. The apparatus may include a processor, memory coupled with the processor, and instructions stored in the memory. The instructions may be executable by the processor to cause the apparatus to identify that a UE is operating in a network that supports full-duplex communications, receive, from a base station in the network, an indication of time or frequency resources in which an uplink communication to the base station overlaps in time with a downlink communication to the UE, and decode the downlink communication based on the indication.

Another apparatus for wireless communication is described. The apparatus may include means for identifying that a UE is operating in a network that supports full-duplex communications, receiving, from a base station in the network, an indication of time or frequency resources in which an uplink communication to the base station overlaps in time with a downlink communication to the UE, and decoding the downlink communication based on the indication.

A non-transitory computer-readable medium storing code for wireless communication at a UE is described. The code may include instructions executable by a processor to identify that the UE is operating in a network that supports full-duplex communications, receive, from a base station in the network, an indication of time or frequency resources in which an uplink communication to the base station overlaps in time with a downlink communication to the UE, and decode the downlink communication based on the indication.

Some examples of the method, apparatuses, and non-transitory computer-readable medium described herein may further include operations, features, means, or instructions for determining a number of symbols during which the uplink communication overlaps with the downlink communication based on the indication.

Some examples of the method, apparatuses, and non-transitory computer-readable medium described herein may further include operations, features, means, or instructions for determining that the indication includes a bitmap, where determining the number of symbols during which the uplink communication overlaps with the downlink communication may be based on the bitmap.

Some examples of the method, apparatuses, and non-transitory computer-readable medium described herein may further include operations, features, means, or instructions for identifying a rate-matching configuration associated with the time or frequency resources in which the uplink communication overlaps with the downlink communication, and decoding the downlink communication based on the rate-matching configuration.

In some examples of the method, apparatuses, and non-transitory computer-readable medium described herein, identifying the rate-matching configuration further may include operations, features, means, or instructions for receiving an index value in DCI, and identifying the rate-matching configuration from a set of rate-matching configurations based on the index value.

Some examples of the method, apparatuses, and non-transitory computer-readable medium described herein may further include operations, features, means, or instructions for identifying the set of rate-matching configurations based on radio resource control (RRC) signaling.

In some examples of the method, apparatuses, and non-transitory computer-readable medium described herein, the set of rate-matching configurations may be preconfigured at the UE.

Some examples of the method, apparatuses, and non-transitory computer-readable medium described herein may further include operations, features, means, or instructions for identifying a portion of the time or frequency resources including rate-matched resources based on the rate-matching configuration, where decoding the downlink communication may be based on the portion of the time or frequency resources including the rate-matched resources.

Some examples of the method, apparatuses, and non-transitory computer-readable medium described herein may further include operations, features, means, or instructions for identifying a portion of the time or frequency resources including punctured resources based on the indication, and decoding the downlink communication based on the portion of the time or frequency resources including the punctured resources.

In some examples of the method, apparatuses, and non-transitory computer-readable medium described herein, identifying the portion of the time or frequency resources including the punctured resources further may include operations, features, means, or instructions for determining frequency information associated with the punctured resources based on the indication, and identifying the portion of the time or frequency resources including the punctured resources based on the frequency information.

In some examples of the method, apparatuses, and non-transitory computer-readable medium described herein, the frequency information includes a number of punctured resource elements (REs) or punctured resource blocks (RBs).

Some examples of the method, apparatuses, and non-transitory computer-readable medium described herein may further include operations, features, means, or instructions for receiving the indication in DCI in a downlink control channel search space.

Some examples of the method, apparatuses, and non-transitory computer-readable medium described herein may further include operations, features, means, or instructions for receiving the DCI including the indication in a first time interval during which the uplink communication overlaps with the downlink communication.

In some examples of the method, apparatuses, and non-transitory computer-readable medium described herein, the DCI schedules at least one of the uplink communication and the downlink communication.

In some examples of the method, apparatuses, and non-transitory computer-readable medium described herein, the DCI may be a second DCI different than a first DCI that schedules at least one of the uplink communication and the downlink communication.

Some examples of the method, apparatuses, and non-transitory computer-readable medium described herein may further include operations, features, means, or instructions for receiving the DCI including the indication in a second time interval after a first time interval during which the uplink communication overlaps with the downlink communication.

In some examples of the method, apparatuses, and non-transitory computer-readable medium described herein, the indication includes an index value associated with the first time interval.

Some examples of the method, apparatuses, and non-transitory computer-readable medium described herein may further include operations, features, means, or instructions for monitoring for the indication based on an identifier associated with the indication.

In some examples of the method, apparatuses, and non-transitory computer-readable medium described herein, the uplink communication includes communication from the UE.

In some examples of the method, apparatuses, and non-transitory computer-readable medium described herein, the uplink communication includes communication from a second UE different from the UE.

Some examples of the method, apparatuses, and non-transitory computer-readable medium described herein may further include operations, features, means, or instructions for decoding the downlink communication based on a log-likelihood ratio (LLR) scaling calculation.

A method of wireless communication at a base station is described. The method may include identifying that the base station is operating in a network that supports full-duplex communications, determining time or frequency resources in which an uplink communication to the base station overlaps in time with a downlink communication to a UE in the network, and transmitting, to the UE, an indication of the time or frequency resources.

An apparatus for wireless communication is described. The apparatus may include a processor, memory coupled with the processor, and instructions stored in the memory. The instructions may be executable by the processor to cause the apparatus to identify that a base station is operating in a network that supports full-duplex communications, determine time or frequency resources in which an uplink communication to the base station overlaps in time with a downlink communication to a UE in the network, and transmit, to the UE, an indication of the time or frequency resources.

Another apparatus for wireless communication is described. The apparatus may include means for identifying that a base station is operating in a network that supports full-duplex communications, determining time or frequency resources in which an uplink communication to the base station overlaps in time with a downlink communication to a UE in the network, and transmitting, to the UE, an indication of the time or frequency resources.

A non-transitory computer-readable medium storing code for wireless communication at a base station is described. The code may include instructions executable by a processor to identify that the base station is operating in a network that supports full-duplex communications, determine time or frequency resources in which an uplink communication to the base station overlaps in time with a downlink communication to a UE in the network, and transmit, to the UE, an indication of the time or frequency resources.

Some examples of the method, apparatuses, and non-transitory computer-readable medium described herein may further include operations, features, means, or instructions for determining a number of symbols during which the uplink communication overlaps with the downlink communication based on the indication.

Some examples of the method, apparatuses, and non-transitory computer-readable medium described herein may further include operations, features, means, or instructions for transmitting the indication including a bitmap, where the bitmap may be based on the number of symbols during which the uplink communication overlaps with the downlink communication.

Some examples of the method, apparatuses, and non-transitory computer-readable medium described herein may further include operations, features, means, or instructions for identifying a rate-matching configuration of a set of rate-matching configurations associated with the time or frequency resources in which the uplink communication overlaps with the downlink communication, and transmitting, to the UE, an index value in DCI, where the index value corresponds to the rate-matching configuration.

Some examples of the method, apparatuses, and non-transitory computer-readable medium described herein may further include operations, features, means, or instructions for transmitting, to the UE, RRC signaling, where the RRC signaling includes a second indication indicating the set of rate-matching configurations.

In some examples of the method, apparatuses, and non-transitory computer-readable medium described herein, the rate-matching configuration includes information pertaining to a portion of the time or frequency resources including rate-matched resources.

Some examples of the method, apparatuses, and non-transitory computer-readable medium described herein may further include operations, features, means, or instructions for identifying a portion of the time or frequency resources including punctured resources, and transmitting, to the UE, information pertaining to the punctured resources within the indication.

In some examples of the method, apparatuses, and non-transitory computer-readable medium described herein, the information pertaining to the punctured resources includes frequency information associated with the punctured resources.

In some examples of the method, apparatuses, and non-transitory computer-readable medium described herein, the frequency information includes a number of punctured REs or punctured RBs.

Some examples of the method, apparatuses, and non-transitory computer-readable medium described herein may further include operations, features, means, or instructions for transmitting the indication in DCI.

Some examples of the method, apparatuses, and non-transitory computer-readable medium described herein may further include operations, features, means, or instructions for transmitting the DCI including the indication in a first time interval during which the uplink communication overlaps with the downlink communication.

In some examples of the method, apparatuses, and non-transitory computer-readable medium described herein, the DCI schedules at least one of the uplink communication and the downlink communication.

In some examples of the method, apparatuses, and non-transitory computer-readable medium described herein, the DCI may be a second DCI different than a first DCI that schedules at least one of the uplink communication and the downlink communication.

Some examples of the method, apparatuses, and non-transitory computer-readable medium described herein may further include operations, features, means, or instructions for transmitting the DCI including the indication in a second time interval after a first time interval during which the uplink communication overlaps with the downlink communication.

In some examples of the method, apparatuses, and non-transitory computer-readable medium described herein, the indication includes an index value associated with the first time interval.

Some examples of the method, apparatuses, and non-transitory computer-readable medium described herein may further include operations, features, means, or instructions for transmitting the indication in a downlink control channel search space.

In some examples of the method, apparatuses, and non-transitory computer-readable medium described herein, the uplink communication includes communication from the UE.

In some examples of the method, apparatuses, and non-transitory computer-readable medium described herein, the uplink communication includes communication from a second UE different from the UE.

BRIEF DESCRIPTION OF THE DRAWINGS

FIG. 2 illustrates an example of a wireless communications system that supports uplink indication for full-duplex operation in accordance with aspects of the present disclosure.

FIG. 3 illustrates an example of a communications timeline that supports uplink indication for full-duplex operation in accordance with aspects of the present disclosure.

FIG. 4 illustrates example resource configurations that support uplink indication for full-duplex operation in accordance with aspects of the present disclosure.

FIGS. 10 and 11 show block diagrams of devices that support uplink indication for full-duplex operation in accordance with aspects of the present disclosure.

FIGS. 14 through 21 show flowcharts illustrating methods that support uplink indication for full-duplex operation in accordance with aspects of the present disclosure.

DETAILED DESCRIPTION

Figure 1:
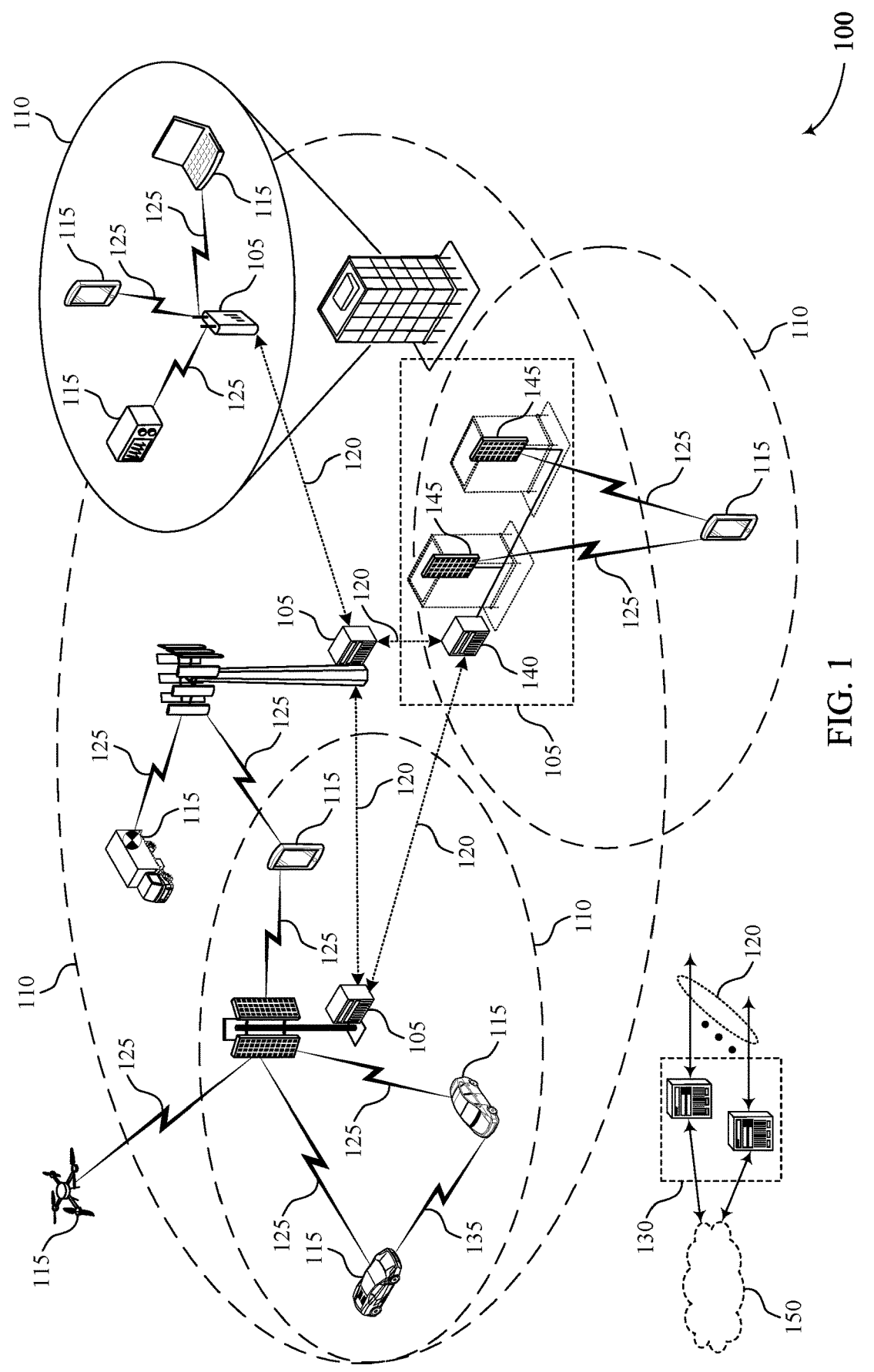
FIG. 1 illustrates an example of a wireless communications system that supports uplink indication for full-duplex operation in accordance with aspects of the present disclosure.

As demand for communication resources increases due to an increasing number of wireless devices communicating over the available spectrum, techniques to efficiently and reliably increase throughput may be desirable. To increase throughput, for example, some wireless communications systems may support full-duplex communications at various wireless devices in the system. For example, both user equipment (UEs) and base stations within a full-duplex communications system may be capable of simultaneous transmission and reception. In some cases, wireless devices that support full-duplex communications may be affected by self-interference caused by signal leakage between transmit and receive antenna arrays. For example, a UE that supports full-duplex communications may experience interference at receive antennas of the UE from its own uplink transmissions (e.g., while transmitting in the uplink and receiving in the downlink in at least partially overlapping resources). Similarly, a full-duplex base station may experience self-interference when receiving uplink transmissions from one or more UEs while simultaneously transmitting on the downlink to a UE, where the downlink transmissions may generate self-interference at receive antennas of the base station.

A wireless device may apply one or more decoding techniques when decoding a received transmission (e.g., a downlink transmission in the case of a UE or an uplink transmission in the case of a base station) that is affected by self-interference to reduce or mitigate the influence of the interference, which may increase the likelihood that the wireless device is able to successfully decode the received transmission. In some cases, however, the wireless device may be unaware of which transmissions are affected by self-interference. For example, the wireless device may buffer a set of resources during which the wireless device may receive a transmission and may decode the buffered resources for the received transmission. As such, the wireless device may be unaware of which of the buffered resources include the received transmission, and therefore unaware if the received transmission is affected by self-interference, until after decoding. Thus, it may be desirable to configure the wireless device to identify or otherwise determine which received transmissions are likely influenced by interference prior to decoding to enable the UE to employ an appropriate decoding technique.

As described herein, various techniques may enhance full-duplex communications in a network and reduce the adverse impacts of the self-interference. In some implementations of the present disclosure, a base station may transmit, to a UE, an indication of time or frequency resources over which a scheduled downlink transmission to the UE overlaps in time with a scheduled uplink transmission to the base station. The UE may use the information provided by the indication, which may be referred to as an uplink indication, to determine which resources that include the downlink transmission are likely affected by self-interference. The UE may select or otherwise determine a decoding technique for decoding the downlink transmission based on determining which resources that include the downlink transmission are likely affected by self-interference. For instance, the UE may decode the downlink transmission with a decoding technique that reduces or mitigates the influence of self-interference if the UE determines that at least a portion of the resources including the downlink transmission overlap in time with the uplink transmission from the UE. As such, the UE may have a greater likelihood for successfully decoding the downlink transmission.

Additionally, in some cases, the UE may determine a decoding technique for the downlink transmission based on one or more other aspects of the downlink transmission. In such cases, the base station may provide information relating to the one or more other aspects of the downlink transmission to the UE. For example, the base station may transmit information to the UE relating to a rate-matching configuration or puncturing information, or both, associated with the resources over which the downlink transmission overlaps in time with the uplink transmission. In some examples, the base station may transmit the uplink indication in downlink control information (DCI) and the UE may receive the uplink indication via a common search space (CSS) set.

Particular aspects of the subject matter described herein may be implemented to realize one or more potential advantages. The described techniques may support improvements in system reliability and robustness such that the UE may be more likely to successfully decode the downlink transmission from the base station. The described techniques may also enable the base station to potentially perform fewer retransmissions of the downlink transmission, which may reduce overall system congestion and interference. Moreover, the UE may perform fewer processing operations or computations associated with monitoring for and decoding the downlink transmission based on having a greater likelihood for successfully decoding the downlink transmission, which may result in greater processing efficiency or improved battery life at the UE, or both.

Aspects of the disclosure are initially described in the context of wireless communications systems. Aspects of the disclosure are additionally described in the context of a communications timeline and resource configurations. Aspects of the disclosure are further illustrated by and described with reference to apparatus diagrams, system diagrams, and flowcharts that relate to uplink indication for full-duplex operation.

FIG. 1 illustrates an example of a wireless communications system 100 that supports uplink indication for full-duplex operation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations

105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

As described herein, a UE 115 or a base station 105 may be capable of supporting full-duplex communications. In such cases, different antennas, antenna arrays, or different portions of an antenna array may be used to simultaneously transmit and receive. An antenna configuration may be used for full-duplex communications, where a transmit antenna may be spatially separated from a receive antenna, which may reduce leakage (e.g., self-interference) from the transmit antenna onto the receive antenna. In other examples (such as for non-full-duplex communications), a same antenna or antenna array may be used to receive and transmit, but not both.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 or a base station 105, or both, may be capable of full-duplex communication. For example, the UE 115 or the base station 105 may simultaneously (e.g., over resources that at least partially overlap in time) transmit and receive signals. In some aspects, the UE 115 or the base station 105 may transmit signals to a device (e.g., another UE 115 or another base station 105) and simultaneously receive signals from the same device. In some other aspects, the UE 115 or the base station 105 may transmit signals to a first device and simultaneously receive signals from a second device.

A UE 115 and a base station 105 may both support full-duplex communications over a communication link 125. In such cases, the UE 115 or the base station 105, or both, may identify resources (e.g., one or more radio frequency spectrum bands or channels) to use for full-duplex communications. The resources may refer to resource blocks (RBs), resource elements (REs), RE groups (REGs), or other sets of one or more physical resources used to transmit in a wireless communications system. In some examples, the UE 115 may identify resources allocated for full-duplex communication and may further identify one or more types of full-duplex communications that the UE 115 may support for each radio frequency spectrum band (e.g., each frequency band) within the allocated resources. For example, the UE 115 may support in-band full-duplex, sub-band full-duplex, or both, for each frequency band within the allocated resources.

As described herein, the UE 115 may experience self-interference while simultaneously transmitting and receiving. For example, the UE 115 may transmit uplink communication from a transmit antenna of the UE 115 to the base station 105 that may cause interference (e.g., self-interference) at a receive antenna of the UE 115. As such, downlink communication that is transmitted to the UE 115 while the UE 115 is transmitting the uplink communication may be adversely influenced by the self-interference caused by the uplink communication. In some cases, the self-interference caused by the uplink communication may result in a lower receive quality of the downlink communication, which may decrease the likelihood that the UE 115 is be able to successfully decode the downlink communication.

In some cases, the UE 115 may reduce or mitigate the influence of self-interference based on decoding the downlink communication using a decoding technique (e.g., a select decoding technique suited for addressing or otherwise compensating for self-interference). In some examples of the present disclosure, the UE 115 may employ the decoding technique based on determining that the downlink communication overlaps in time with the uplink communication (e.g., based on determining that the downlink communication is received in an environment in which self-interference is likely). In some implementations, the UE 115 may receive an indication, from the base station 105, of resources over which the downlink communication overlaps in time with the uplink communication. Accordingly, the UE 115 may determine which resources (e.g., which symbols) include downlink communication that is received in an environment that is likely influenced by self-interference.

The UE 115 may determine to employ a decoding technique for the downlink communication based on determining that the downlink communication is likely influenced by self-interference (e.g., based on determining that the downlink communication is received in a high-interference environment). As such, the UE 115 may experience fewer communication failures in high-interference environments (e.g., in full-duplex communications systems), which may result in greater system reliability and robustness, as well as increased system throughput.

Although described in the context of full-duplex communications, the described techniques are also applicable to other forms of communications, such as half-duplex communications. For example, the UE 115 may receive downlink communication from the base station 105 in resources that at least partially overlap with resources used by a different, nearby UE 115 for uplink communication to the base station 105. In such examples, the downlink communication may be affected by interference from the uplink communication of the nearby UE 115. The UE 115 may similarly receive an indication of the resources over which the downlink communication to the UE 115 overlaps in time with the uplink communication to the base station 105 from the nearby UE 115. The UE 115 may employ a decoding technique to reduce or mitigate the influence of the interference from the nearby UE 115 (e.g., the cross-link interference) in a similar manner to how the UE 115 may employ a decoding technique to reduce or mitigate the influence of self-interference. As such, the described techniques may also provide for more enhanced system capabilities in high-interference environments associated with systems including a number of UEs 115 in close proximity, such as high-density communications systems.

FIG. 2 illustrates an example of a wireless communications system 200 that supports uplink indication for full-duplex operation in accordance with aspects of the present disclosure. In some examples, the wireless communications system 200 may implement aspects of the wireless communications system 100. For example, the wireless communications system 200 may include a UE 115-*a*, a UE 115-*b*, a base station 105-*a*, and a base station 105-*b*, which may be examples of the corresponding devices described with reference to FIG. 1. In some cases, the wireless communications system 200 (e.g., a 5G or an NR system) may support enhancements for full-duplex communications at both ends of a communication link (e.g., for both a UE 115 and a base station 105). For example, a base station 105-*a* may determine time or frequency resources, or both, in which uplink communication (e.g., one or more uplink transmissions 220) to the base station 105-*a* overlaps in time with downlink communication (e.g., one or more downlink transmissions 225) to a UE 115-*a*. The base station 105-*a* may transmit an indication, which may be referred to as an uplink indication 230, of the time or frequency resources to the UE 115-*a* and the UE 115-*a* may decode the downlink communication based on the uplink indication 230. As such, the wireless communications system 200, a full-duplex communications system or a high-density communications system, may provide for more reliable and robust communication in high-interference environments.

In some cases, the UE 115-*a* and the base station 105-*a* may support full-duplex communications over an uplink communication link 205-*a* and a downlink communication link 210-*a*. If transmitting and receiving signals using full-duplex communications (simultaneously), the UE 115-*a* or the base station 105-*a*, or both, may experience self-interference due to transmitting and receiving signals via spatially proximate antenna arrays. For instance, the UE 115-*a* may transmit a signal (e.g., an uplink transmission 220) to the base station 105-*a* on the uplink communication link 205-*a* via a transmit antenna array while simultaneously receiving a signal (e.g., a downlink transmission 225) from the base station 105-*a* on the downlink communication link 210-*a* via a receive antenna array. In cases in which the transmit antenna array is spatially proximate to the receive antenna array, the UE 115-*a* may experience interference at the receive antenna array from the transmissions via the transmit antenna array. In particular, the UE 115-*a* may experience interference on the receive antennas of the UE 115-*a* from its own uplink transmissions 220. Additionally or alternatively, the UE 115-*a* may experience cross-link interference from uplink transmissions 220 of a nearby or neighboring UE 115-*b*. For example, the UE 115-*a* may experience cross-link interference from uplink transmissions 220 by the UE 115-*b*, which may be nearby or within a threshold distance of the UE 115-*a*. For instance, the UE 115-*b* may transmit over uplink communication link 205-*b*, which may generate or otherwise cause interfering signals over a communication link 215-*a* that result in interference at the UE 115-*a*. The UE 115-*a* may similarly experience cross-link interference from the base station 105-*b* via a communication link 215-*c*.

The base station 105-*a* may experience self-interference for similar reasons. For instance, the base station 105-*a* may experience self-interference if receiving uplink communications from one or more UEs 115 (e.g., such as the UE 115-*a* or the UE 115-*b*) while simultaneously transmitting on the downlink to the UE 115-*a*, where the downlink signaling may generate the self-interference on the reception on the uplink at the base station 105-*a*. Additionally, the base station 105-*a* may experience cross-link interference from the base station 105-*b* (over a communication link 215-*d*) or from the UE 115-*b* (over a communication link 215-*b*). Additionally, similar conditions may apply to the UE 115-*b* and the base station 105-*b* based on simultaneously communicating via the uplink communication link 205-*b* and the downlink communication link 210-*b* or based on being within close proximity of the UE 115-*a* or the base station 105-*a*.

In some cases, increasing the spatial separation between the transmit antenna array and the receive antenna array may reduce self-interference. However, an achievable spatial separation between the transmit antenna array and the receive antenna array on a device may be limited based on a geometry, a size, or a configuration of the device. As such, additional techniques for reducing the influence of self-interference and cross-link interference may further enhance the reliability of full-duplex communications systems.

As described herein, the UE 115-*a*, the UE 115-*b*, the base station 105-*a*, or the base station 105-*b* may implement methods that may reduce or mitigate the influence of interference in full-duplex communications systems (e.g., in which self-interference may be likely) and in high-density communications systems (e.g., in which cross-link interference may be likely). Although examples are provided in the context of full-duplex communications between the UE 115-*a* and the base station 105-*a* over the uplink communication link 205-*a* and the downlink communication link 210-*a*, the techniques described are equally applicable to the UE 115-*b* and the base station 105-*b* over the uplink communication link 205-*b* and the downlink communication link 210-*b*. Further, the techniques described herein are not limited to communications between a UE 115 and a base station 105 and may apply to any two communicating devices that may support full-duplex communications or any two communicating devices in a high-density communications system.

In some cases, the base station 105-*a* may allocate resources to the UE 115-*a* for the UE 115-*a* to use for uplink communication or downlink communication, or both. For example, the base station 105-*a* may configure the UE 115-*a* to receive one or more downlink transmissions 225 over the downlink communication link 210-*a* in a set of the resources that are allocated for downlink communication. In some cases, the base station 105-*a* may schedule the downlink transmissions 225 for the set of resources via DCI and the UE 115-*a* may monitor the set of resources for the scheduled downlink transmissions 225 accordingly. In some cases, the base station 105-*a* may also allocate a set of resources for uplink communication to the base station 105-*a*. In some aspects, the base station 105-*a* may schedule one or more uplink transmissions 220 from the UE 115-*a* over the uplink communication link 205-*a* in the set of resources allocated for uplink communication via DCI and the UE 115-*a* may transmit the uplink transmissions 220 accordingly. In some other aspects, the UE 115-*a* may otherwise determine to transmit one or more uplink transmissions 220 in the set of resources allocated for uplink communication (e.g., without scheduling information from the base station 105-*a*). Additionally or alternatively, the UE 115-*a* may be scheduled to receive downlink communication over the communication link 215-*c* and to transmit uplink communication over the communication link 215-*a* (e.g., the UE 115-*a* may be a full-duplex, multi-transmission reception point (TRP) UE).

In some further aspects, the base station 105-*a* or the base station 105-*b* may schedule one or more uplink transmissions 220 from the UE 115-*b* to the base station 105-*a* over the communication link 215-*b* in the set of resources allocated for uplink communication. Additionally or alternatively, the UE 115-*b* may otherwise determine to transmit one or more uplink transmissions 220 to the base station 105-*a* in the set of resources allocated for uplink communication.

In some examples, the set of resources allocated for uplink communication may at least partially overlap in time with the set of resources allocated for downlink communication. As such, the UE 115-*a* may be scheduled for full-duplex communication with the base station 105-*a* or the UE 115-*a* may receive a downlink transmission 225 from the base station 105-*a* at the same time that the UE 115-*b* may transmit an uplink transmission 220 to the base station 105-*a*, or both. In such cases, the UE 115-*a* may experience interference (e.g., self-interference or cross-link interference, or both) when receiving the downlink transmission 225 from the base station 105-*a*.

In some cases, the UE 115-*a* may be unaware of the presence of the interference when receiving the downlink transmission 225. For example, the UE 115-*a* may be unaware of whether the downlink transmission 225 is received in an overlapping time period as the uplink transmission 220 is transmitted. For instance, the UE 115-*a* may buffer the set of resources allocated for downlink communication and may decode the buffered resources without knowledge of which of the buffered resources includes the downlink transmission 225. In some cases, for example, the UE 115-*a* may buffer the resources allocated for downlink communication (e.g., may buffer a slot of the resources allocated for downlink communication) and may decode the buffered resources upon reception (and decoding) of DCI associated with the buffered resources. The UE 115-*a* may use the DCI to determine where the downlink transmission 225 is within the buffered resources, but the UE 115-*a* may still be unaware about when (e.g., during which symbols) the downlink transmission 225 overlaps in time with an uplink transmission 220. For example, the UE 115-*a* may receive the DCI at a later time such that the UE 115-*a* may no longer be aware of when it transmitted an uplink transmission 220.

Alternatively, the UE 115-*a* may receive an indication of which resources include the downlink transmission 225 via higher layers (e.g., a higher physical layer), which may also result in a lack of knowledge about when the downlink transmission 225 overlaps in time with an uplink transmission 220. Additionally or alternatively, in examples in which an uplink transmission 220 from the UE 115-*b* at least partially overlaps in time with the downlink transmission 225 to the UE 115-*a* from the base station 105-*a*, the UE 115-*a* may be unaware of over which symbols the uplink transmission 220 overlaps with the downlink transmission 225 due to a lack of shared scheduling information between the UE 115-*a* and the UE 115-*b*.

In some cases, the UE 115-*a* may be unable to or may otherwise fail to decode the downlink transmission 225 without knowledge of the high-interference environment in which the downlink transmission 225 was received (e.g., without knowledge of the likely presence of self-interference or cross-link interference, or both). For example, a downlink transmission 225 that is received in the presence of high interference may be associated with a high path-loss and poor reception quality, such as a poor received power or a low signal-to-noise ratio (SNR), or both, and the UE 115-*a* may employ one or more decoding techniques to increase the likelihood that the UE 115-*a* is able to successfully decode the downlink transmission 225. In some examples, the UE 115-*a* may apply log-likelihood ratio (LLR) scaling to the downlink transmission 225 to reduce or mitigate the influence that interference has on the decoding process for the downlink transmission 225.

In some implementations of the present disclosure, the wireless communications system 200 may support signaling of an uplink indication 230 from the base station 105-*a* that provides timing information to the UE 115-*a* to use in determining an appropriate decoding technique for decoding the downlink transmission 225. For example, the UE 115-*a* may receive the uplink indication 230 from the base station 105-*a* that informs the UE 115-*a* of the time or frequency resources in which an uplink transmission 220 (from the UE 115-*a* or the UE 115-*b*, or both) overlaps in time with the downlink transmission 225 to the UE 115-*a*. The UE 115-*a* may determine, based on the uplink indication 230, that the downlink transmission 225 was received at a time when there was likely high levels of interference at the receive antenna array of the UE 115-*a* and that the reception quality of the downlink transmission 225 is likely influenced by the interference.

In some examples, the uplink indication 230 may include a direct indication of which resources (e.g., which time and frequency resources) allocated for downlink communication that include the downlink transmission 225 overlap in time with the uplink transmission 220. In some other examples, the uplink indication 230 may include or otherwise indicate a number of symbols during which the uplink transmission 220 overlaps with the downlink transmission 225, and the UE 115-*a* may use the indication of the number of symbols to determine which resources allocated for downlink communication that include the downlink transmission 225 overlap in time with the uplink transmission 220. As such, the UE 115-*a*, when decoding the buffered resources including the downlink transmission 225, may employ one or more decoding techniques when decoding the resources during the number of symbols provided by the uplink indication 230. Such one or more decoding techniques may increase the likelihood that the UE 115-*a* is able to successfully decode the downlink transmission 225.

In some examples, the base station 105-*a* may transmit the uplink indication 230 to the UE 115-*a* in DCI. In some implementations, the base station 105-*a* may transmit the uplink indication 230 to the UE 115-*a* in the same DCI that schedules the downlink transmission 225 to the UE 115-*a* or the uplink transmission 220, or both. In some other implementations, the UE 115-*a* may transmit the uplink indication 230 in a second DCI different than the DCI that schedules the downlink transmission 225 or the uplink transmission 220. In some examples of such implementations, the base station 105-*a* may transmit the uplink indication 230 in the second DCI within the same time interval (e.g., within the same slot) during which the uplink transmission 220 overlaps in time with the downlink transmission 225. In such examples, the base station 105-*a* may transmit the DCI that schedules the downlink transmission 225 or the uplink transmission 220 and the second DCI to the UE 115-*a* within the same time interval (e.g., within the same slot). In some aspects, the location or configuration (e.g., type) of the second DCI within the same time interval as the DCI that schedules the downlink transmission 225 or the uplink transmission 220 may be defined in a specification.

Alternatively, in some other examples of implementations involving transmitting the uplink indication 230 in a second DCI different than the DCI that schedules the downlink transmission 225 or the uplink transmission 220, the base station 105-*a* may transmit the second DCI in a different time interval (e.g., in a different slot) than the time interval during which the uplink transmission 220 overlaps in time with the downlink transmission 225. In such examples, the indication may include an index value (e.g., a bit value or an integer value) that provides information relating to the time interval for which the uplink indication 230 is relevant (e.g., information indicating or otherwise relating to which slot includes the resources in which the uplink transmission 220 overlaps in time with the downlink transmission 225).

For example, the UE 115-*a* may receive the uplink indication 230 in DCI a number of slots after the slot that includes the resources over which the uplink transmission 220 overlaps in time with the downlink transmission 225 and the UE 115-*a* may identify, based on the index value in the uplink indication 230, which slot includes the resources over which the uplink transmission 220 overlaps in time with the downlink transmission 225. In some aspects, the UE 115-*a* may buffer the set of resources allocated for downlink communication and may begin a decoding process of the buffered resources upon reception of the uplink indication 230. As such, the UE 115-*a* may store the buffered resources until the UE 115-*a* determines that an uplink indication 230 associated with the buffered resources is received, at which point the UE 115-*a* may select or otherwise determine an appropriate decoding technique (e.g., based on the likely presence of self-interference or cross-link interference, or both, at the time of reception of the downlink transmission 225) and may decode the downlink transmission 225 in the buffered resources accordingly.

The UE 115-*a* may receive the uplink indication 230 (e.g., the DCI including the uplink indication 230) via a downlink control channel search space. For example, the UE 115-*a* may receive the uplink indication 230 in a physical downlink control channel (PDCCH) CSS set. In some examples, the UE 115-*a* may receive the uplink indication 230 via a Type3-PDCCH CSS set configured by SearchSpace in downlink control channel configuration information, such as PDCCH-Config with searchSpaceType common. In some implementations, the UE 115-*a* may monitor for the uplink indication 230 based on an identifier associated with the uplink indication 230. For example, the UE 115-*a* may monitor for the uplink indication 230 based on a radio network temporary identifier (RNTI) associated with the uplink indication 230.

In some examples, the base station 105-*a* may provide information relating to a number of other aspects associated with the downlink transmission 225 that the UE 115-*a* may use to successfully decode the downlink transmission 225, as described in more detail with reference to FIG. 3. For example, the base station 105-*a* may provide information relating to a rate-matching configuration, a puncturing pattern, or a pre-emption indication (PI), or a combination thereof, that is associated with the downlink transmission 225. The rate-matching configuration, the puncturing pattern, or the PI, or the combination thereof, may be associated with the resources over which the uplink transmission 220 overlaps in time with the downlink transmission 225 and the UE 115-*a* may account for such aspects in the decoding process of the downlink transmission.

FIG. 3 illustrates an example of a communications timeline 300 that supports uplink indication for full-duplex operation in accordance with aspects of the present disclosure. In some examples, the communications timeline 300 may implement or be implemented to realize aspects of the wireless communications system 100 or the wireless communications system 200. For example, the communications timeline 300 may illustrate communication between a UE 115 and a base station 105, which may be examples of corresponding devices as described herein, including with reference to FIGS. 1 and 2. For example, the UE 115 may monitor a physical downlink shared channel (PDSCH) 305 for downlink communication to the UE 115 on resources that at least partially overlap in time with a physical uplink shared channel (PUSCH) 310 used by the UE 115 or a different, nearby UE 115 for uplink communication to the base station 105.

Although an example implementation of the communications timeline 300 is described in the context of full-duplex communications between a UE 115 and a base station 105, the described techniques may similarly apply if the uplink transmission is transmitted by a different UE 115 that is nearby the UE 115 that receives the downlink transmission. In such contexts, the UE 115 may receive the downlink transmission in the presence of cross-link interference. In some examples, the UE 115 experiencing cross-link interference may receive an uplink indication from the base station 105 indicating the resources over which the downlink transmission to the UE 115 overlaps in time with an uplink transmission to the base station 105 (e.g., from the different, nearby UE 115) and the UE 115-a may likewise determine a decoding technique based on determining that the downlink transmission is likely influenced by the cross-link interference.

Further, the communications timeline illustrates an example implementation of the present disclosure in the context of a sub-band full-duplex (e.g., flexible duplex) mode. Accordingly, the communications timeline 300 includes a downlink BWP and an uplink BWP separated in frequency by a guard band 330. However, the techniques described herein may be equally applicable to an in-band full-duplex mode, as described in more detail with reference to FIG. 4. The communications timeline 300 includes the PDSCH 305 (e.g., resources allocated for downlink communication), the PUSCH 310 (e.g., resources allocated for uplink communication), a PDCCH 315, downlink demodulation reference signals (DMRSs) 320, and an uplink DMRS 325. As illustrated by FIG. 3, the communications timeline 300 spans a duration of 14 symbols. The communications timeline 300, however, may alternatively span a different number of symbols without exceeding the scope of the present disclosure, where the number of symbols may be referred to herein as a time interval (e.g., a slot) during which an uplink transmission overlaps with a downlink transmission. The symbols may be examples of OFDM symbols.

According to the described techniques, the UE 115 may receive an indication (e.g., the uplink indication) of the time or frequency resources over which an uplink transmission to the base station 105 overlaps in time with the downlink transmission to the UE 115 prior to decoding the PDSCH 305 (e.g., decoding a buffered PDSCH 305 including the downlink transmission), which may enable the UE 115 to employ a decoding technique that may increase the likelihood that the UE 115 is able to successfully decode the downlink transmission. For example, the UE 115 may receive an uplink indication indicating the resources of the PDSCH 305-a that include a downlink transmission that at least partially overlaps in time with resources of the PUSCH 310 that include an uplink transmission. In some examples, the UE 115, based on the uplink indication, may determine a number of symbols during which the uplink transmission overlaps with the downlink transmission. For instance, the uplink indication may include a bitmap associated with the number of symbols within a time interval, such as a slot, that indicates during which symbols the uplink transmission overlaps with the downlink transmission. In some examples, the bitmap may be a 14 bit bitmap (in examples in which the time interval includes 14 symbols, where each bit may correspond to a symbol of the time interval). The UE 115 may receive the uplink indication in DCI, which may be carried by a downlink control channel, such as the PDCCH 315.

In an example, the UE 115 may identify that the downlink transmission overlaps with the uplink transmission during at least the ninth symbol of the time interval (e.g., n=8 as illustrated in the timeline of FIG. 3) based on the uplink indication. As such, the ULE 115 may determine that the PDSCH 305-a includes the downlink transmission and that PUSCH 310-a includes the uplink transmission and, accordingly, that the downlink transmission carried by the PDSCH 305-a is likely influenced by interference (e.g., was likely received in a high-interference environment). As such, the UE 115 may determine a decoding technique based on the likely presence of interference, which may result in a greater likelihood for successful decoding of the downlink transmission by the UE 115. Although the PDSCH 305-a is illustrated spanning a single symbol (e.g., a single OFDM symbol), the described techniques equally apply when the PDSCH 305-a spans multiple symbols.

Additionally, in some examples, the UE 115 may determine a decoding technique based on a number of other aspects associated with the downlink transmission that may further increase the likelihood that the UE 115 is able to successfully decode the downlink transmission, such as a rate-matching configuration, puncturing information, or a PI, or a combination thereof. For example, the base station 105 may provide information relating to the rate-matching configuration, the puncturing information, or the PI, or a combination thereof, that is associated with the downlink transmission based on the uplink indication. The rate-matching configuration, the puncturing pattern, or the PI, or the combination thereof, may be associated with the resources in which the uplink transmission overlaps in time with the downlink transmission (e.g., the PDSCH 305-a, such that indicated aspects may apply to a subset of the resources allocated for downlink communication or a subset of the resources including the downlink transmission).

In some examples, the base station 105 may provide an index value (e.g., a bit value or an integer value) that the UE 115 may use to determine a rate-matching configuration or a rate-matching technique that is associated with the resources of the downlink transmission that overlap in time with the uplink transmission, such as the PDSCH 305-a. In some aspects, the base station 105 may provide the index value within the DCI including the indication or within the DCI scheduling the downlink transmission, or both (e.g., in the case that the indication is within the DCI scheduling the downlink transmission).

The UE 115 may be pre-defined with a set of rate-matching configurations and the index value may correspond to one rate-matching configuration of the pre-defined set of rate-matching configurations. In some implementations, the base station 105-a may configure the set of rate-matching configurations at the UE 115 via control signaling, such as RRC signaling. In some other implementations, the UE 115 may store a fixed set of rate-matching configurations. For example, the UE 115 may store a pre-configured set of rate-matching configurations associated with a capability of the UE 115 (e.g., a set of rate-matching configurations that the UE 115 is capable of decoding). Accordingly, the UE 115 may identify the index value in the DCI and may determine the rate-matching configuration of the set of rate-matching configurations based on the index value. In some aspects, the rate-matching configuration may include information pertaining to a portion of the time or frequency resources of the PDSCH 305-a including rate-matched resources. As such, the UE 115 may identify that a portion of the PDSCH 305-*a* includes rate-matched resources and the UE 115 may decode the portion of the PDSCH 305-*a* accordingly (e.g., based on the rate-matching configuration of the rate-matched resources).

In some aspects, the base station 105 may employ rate-matching techniques to dynamically adjust the PDSCH 305 resource allocation for the UE 115 based on the presence of system information or downlink DMRS 320. For example, the base station 105 may signal a rate-matching configuration (e.g., or an indication, such as an index value, of a rate-matching configuration) to the UE 115 that may effectively reserve an amount of resources of the PDSCH 305 for system information, a downlink DMRS 320, or other, higher priority, transmissions. In some cases, according to a rate-matching configuration, modulated symbols of a channel, such as the PDSCH 305, may be mapped to the resources assigned to the channel by DCI, except for reserved resources where rate-matching is applied under the assumption that the base station 105 has refrained from allocating the reserved resources to the channel. As such (e.g., in cases in which a large amount of resources is reserved), rate-matching configurations may provide for high efficiency resource usage. Further, in some cases, rate-matching techniques may be useful for the UE 115 in the case that DCI is mis-detected. In some additional cases, the UE 115 may use the rate-matching configuration to reserve resources of the PUSCH 310 for the uplink DMRS 325.

Additionally or alternatively, the base station 105 may provide information relating to a portion of the PDSCH 305-*a* that includes punctured resources. For example, the UE 115 may determine frequency information associated with the portion of the PDSCH 305-*a* that includes punctured resources based on the uplink indication and the UE 115 may identify the punctured resources based on the frequency information. In some examples, the frequency information may provide a number of frequency resources that include (or are) punctured resources. For example, in some implementations, the UE 115, using the frequency information, may identify a number of REs of the PDSCH 305-*a* that are punctured. In some other implementations, the UE 115, using the frequency information, may identify a number of RBs of the PDSCH 305-*a* that are punctured. In some further implementations, the UE 115, using the frequency information, may identify a frequency range over which a puncturing pattern applies. For example, the UE 115 may identify a regularity (e.g., an interval or granularity in the frequency domain, such as per a number of REs or per a number of RBs) of resource puncturing and over which frequency range the puncturing pattern may apply to. In some cases (e.g., in cases in which a large amount of resources is punctured), the decoding process of the downlink transmission may be impacted. As such, the UE 115 may identify the punctured resources and decode the downlink transmission accordingly.

In some aspects, the base station 105 may employ puncturing to more efficiently use available resources. For example, the PDSCH 305 allocated to the UE 115 for downlink communication may be punctured and the base station 105 may transmit system information, a downlink DMRS 320, or other higher priority transmissions in the punctured resources. In some cases, the system information or the downlink DMRS 320 may be measured within a small amount of resources and puncturing may sufficiently reserve the resources for system information transmissions while also maintaining simplicity and robustness of a system. In some cases, based on puncturing, modulated symbols of a channel, such as the PDSCH 305, may be mapped to the resources assigned to the channel by DCI except for the punctured resources as if the base station 105 allocated the punctured resources to the channel. For instance, regardless of whether puncturing is implemented, modulated symbols are mapped to the remaining resources in a same way (as compared to how the modulated symbols would be mapped absent of puncturing). In some cases, the UE 115 may use the puncturing information to reserve resources of the PUSCH 310 for the uplink DMRS 325.

Additionally or alternatively, the PDSCH 305-*a* may be associated with a PI that may indicate that a set of time and frequency resources of the PDSCH 305-*a* may be reassigned for other communication (e.g., higher priority communication, such as URLLC). For example, the base station 105 may cancel a portion (or all of) the PDSCH 305 (including PDSCH 305-*a*) assigned or allocated for the UE 115 in the case that the downlink transmissions scheduled for the UE 115 are lower priority (e.g., eMBB transmissions) than downlink transmissions to another UE (e.g., a URLLC UE). In some examples, the base station 105-*a* may transmit the PI associated with the PDSCH 305-*a* to the UE 115 within the uplink indication or in the same DCI as the uplink indication. In some other examples, the base station 105-*a* may transmit the PI associated with the PDSCH 305-*a* to the UE 115 in a different DCI than the DCI used to transmit the uplink indication. The base station 105 may transmit the PI in a DCI to reassign resources that were originally expected to carry a different transmission than the one which they may actually carry.

In some cases, the PI is received in DCI at the end of a slot. As such, the UE 115 may identify that an amount of resources of the resources that the UE 115 buffers for the downlink transmission may be reserved or re-purposed for other transmissions. Accordingly, the UE 115 may refrain from decoding the reserved resources for the downlink transmission (e.g., a downlink transmission carried by PDSCH 305). For instance, the UE 115 may empty a buffer associated with such reserved resources.

As such, the UE 115 may receive the uplink indication and, in some examples, identify a number of additional aspects associated with the downlink transmission. The UE 115 may use the uplink indication and the aspects of the downlink transmission during a decoding process associated with the downlink transmission, which may increase the likelihood that the UE 115 is able to successfully decode the downlink transmission. For instance, the UE 115 may use the information provided by the base station 105-*a* to determine that the downlink transmission was likely received during a time period associated with high interference at the UE 115 and to determine, for example, a rate-matching configuration, a puncturing pattern, a PI, or a combination thereof, associated with the downlink transmission. Accordingly, the UE 115 may select a decoding technique based on the high-interference environment in which the downlink transmission was received and the additional aspects associated with the downlink transmission and decode the downlink transmission according to the selected decoding technique.

FIG. 4 illustrates example resource configurations 400, 401, and 402 that support uplink indication for full-duplex operation in accordance with aspects of the present disclosure. In some examples, the resource configurations 400, 401, and 402 may implement or be implemented to realize aspects of the wireless communications system 100 or the wireless communications system 200. For example, the resource configurations 400, 401, and 402 may illustrate resource allocations for communications between a UE 115 and a base station 105, which may be examples of corresponding devices as described herein, including with reference to FIGS. 1 and 2. In some cases, the UE 115 and the base station 105 may support full-duplex communications according to which the UE 115 may receive one or more downlink transmissions over a PDSCH 405 and transmit one or more uplink transmissions over a PUSCH 410 to the base station 105. Alternatively, the UE 115 may receive one or more downlink transmissions over the PDSCH 405 while a different, nearby UE 115 may transmit one or more uplink transmissions over the PUSCH 410 to the base station 105. In some examples, the UE 115 may receive an indication of the time or frequency resources in which the downlink transmission to the UE 115 overlaps in time with the uplink transmission to the base station 105 and may decode the downlink transmission accordingly, which may result in a greater likelihood for successfully decoding the downlink transmission by the UE 115.

In some cases, the resource configurations 400, 401, and 402 may be examples of the resource configurations configured by the base station 105 according to the full-duplex capability of the UE 115. The resource configurations 400 and 401 may illustrate examples of in-band full-duplex and resource configuration 402 may illustrate an example of sub-band full-duplex.

In the example of the resource configuration 400, the base station 105 may allocate the PDSCH 405-a for downlink communication to the UE 115 and may allocate the PUSCH 410-a for uplink communication to the base station 105 in overlapping frequency bands, such that the UE 115 and the base station 105 may transmit and receive over the same time and frequency resources (e.g., in at least partially overlapping time and frequency resources). As described herein, the UE 115 may receive an uplink indication indicating that the PDSCH 405-a (e.g., the time or frequency resources of the PDSCH 405-a) carries a downlink transmission to the UE 115 overlapping in time with an uplink transmission to the base station 105 carried by the PUSCH 410-a. Accordingly, the UE 115 may determine that the downlink transmission received over the PDSCH 405-a was likely received in a high-interference environment and may decode the downlink transmission accordingly, as described in more detail with reference to FIGS. 2 and 3.

In the example of the resource configuration 401, the base station 105 may allocate the PDSCH 405-b for downlink communication to the UE 115 and may allocate the PUSCH 410-b for uplink communication to the base station 105 in overlapping frequency bands, such that the UE 115 and the base station 105 may transmit and receive on the same time and frequency resources (e.g., in at least partially overlapping time and frequency resources). As described herein, the UE 115 may receive an uplink indication indicating that the PDSCH 405-b (e.g., the time or frequency resources of the PDSCH 405-b) carries a downlink transmission to the UE 115 overlapping in time with an uplink transmission to the base station 105 carried by the PUSCH 410-b. Accordingly, the UE 115 may determine that the downlink transmission received over the PDSCH 405-b was likely received in a high-interference environment and may decode the downlink transmission accordingly, as described in more detail with reference to FIGS. 2 and 3.

In the example of the resource configuration 402, the base station 105 may allocate the PDSCH 405-c for downlink communication to the UE 115 and may allocate the PUSCH 410-c for uplink communication to the base station 105 in separate frequency bands, such that the UE 115 and the base station 105 may transmit and receive over overlapping time resources and different frequency resources. In some aspects, the PDSCH 405-c and the PUSCH 410-c may be separated in frequency by a guard band 415. As described herein, the UE 115 may receive an uplink indication indicating that the PDSCH 405-c (e.g., the time or frequency resources of the PDSCH 405-c) carries a downlink transmission to the UE 115 overlapping in time with an uplink transmission to the base station 105 carried by the PUSCH 410-c. Accordingly, the UE 115 may determine that the downlink transmission received in PDSCH 405-c was likely received in a high-interference environment and may decode the downlink transmission accordingly, as described in more detail with reference to FIGS. 2 and 3.

Alternatively, the resource configurations 400, 401, and 402 may be examples of resource configurations for different communication types (e.g., half-duplex communication). For example, the resource configurations 400, 401, and 402 may illustrate resources that are allocated to multiple UEs 115 for communication with the base station 105. For instance, the base station 105 may allocate the PDSCH 405 for downlink transmission to a first UE 115 from the base station 105 and may allocate the PUSCH 410 for uplink transmission to the base station 105 from a second UE 115.

Figure 5:
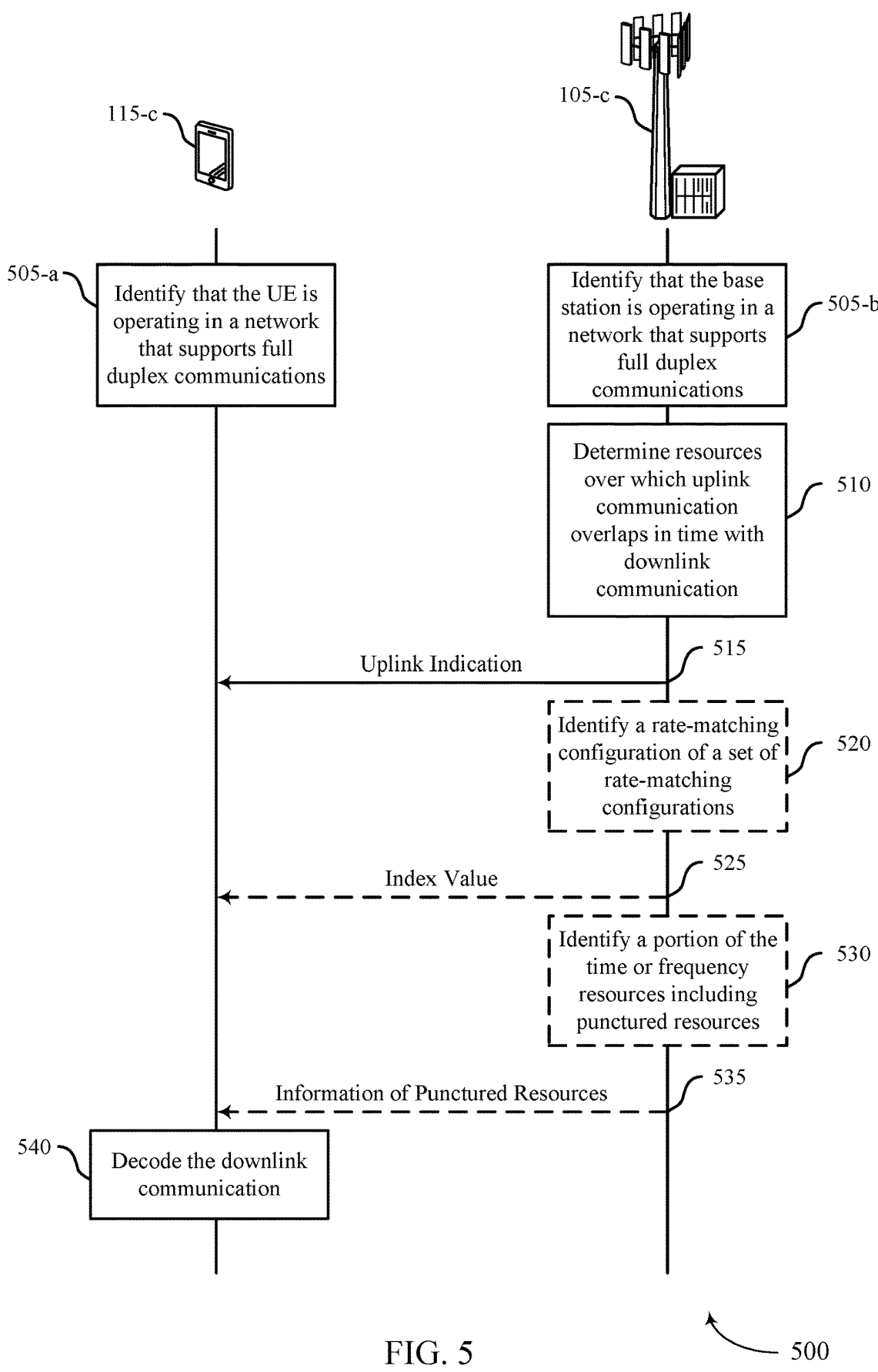
FIG. 5 illustrates an example of a process flow that supports uplink indication for full-duplex operation in accordance with aspects of the present disclosure.

FIG. 5 illustrates an example of a process flow 500 that supports uplink indication for full-duplex operation in accordance with aspects of the present disclosure. In some examples, the process flow 500 may implement or be implemented to realize aspects of the wireless communications system 100 or the wireless communications system 200. For example, the process flow 500 may include a UE 115-c and a base station 105-c, which may be examples of corresponding devices as described herein, including with reference to FIGS. 1 and 2. In some examples, the UE 115-c may receive an indication of the time or frequency resources in which a downlink transmission to the UE 115-c overlaps in time with an uplink transmission to the base station 105-c and the UE 115-c may decode the downlink transmission accordingly, which may result in a greater likelihood for successfully decoding the downlink transmission by the UE 115-c. Alternative examples of the following may be implemented, where some steps are performed in a different order than described or are not performed at all. In some cases, steps may include additional features not mentioned herein, or further steps may be added.

At 505-a, the UE 115-c may identify that the UE 115-c is operating in a network that supports full-duplex communications. For example, the UE 115-c may identify a full-duplex capability of the UE 115-c and may identify that the UE 115-c has been allocated resources from the base station 105-c for simultaneous uplink communication (e.g., one or more uplink transmissions) and downlink communication (e.g., one or more downlink transmissions). Similarly, at 505-b, the base station 105-c may identify that the base station 105-c is operating in a network that supports full-duplex communications. For example, the base station 105-c may identify that the UE 115-c is capable of communicating in a full-duplex communications mode and may allocate resources to the UE 115-c for simultaneous uplink communication and downlink communication.

At 510, the base station 105-c may determine time or frequency resources over which uplink communication to the base station 105-c overlaps in time with downlink communication to the UE 115-c. For example, the base station 105-c may receive the uplink communication, which may be referred to as an uplink transmission, that overlaps in time with the downlink communication, which may similarly be referred to as a downlink transmission, that the base station 105-c is transmitting to the UE 115-c. As such, the base station 105-c may determine that the UE 115-c likewise receives the downlink transmission from the base station 105 in at least partially overlapping time domain resources as the uplink transmission (which may be from the UE 115-c or a different, nearby UE 115) and may, accordingly, determine that the UE 115-c may likely receive the downlink transmission in a high-interference environment.

At 515, the base station 105-c may transmit, to the UE 115-c, an indication of the time or frequency resources over which the uplink communication overlaps with the downlink communication. In some aspects, the indication may be referred to as an uplink indication. The uplink indication may include an indication of the resources over which the UE 115-c may have received a downlink transmission in resources that at least partially overlap with resources (e.g., time domain resources) of an uplink transmission from the UE 115-c that may contribute to self-interference at the UE 115-c or an uplink transmission from a different UE 115 that may contribute to cross-link interference at the UE 115-c, or both.

In some examples, the base station 105-c may transmit the uplink indication in DCI and the base station 105-c may transmit the DCI including the uplink indication within the same time interval (e.g., the same slot) during which the uplink transmission overlaps with the downlink transmission. In such examples, the base station 105-c may transmit the uplink indication in the same DCI that schedules the downlink communication or the uplink communication, or both. Alternatively, the base station 105-c may transmit the uplink indication in a second DCI that is different than the DCI that schedules the downlink communication or the uplink communication, or both. In some other examples, the base station 105-c may transmit the uplink indication during a different time interval (e.g., a different slot) after the time interval during which the uplink transmission overlaps with the downlink transmission. In such examples, the uplink indication may include an index value associated with (e.g., an index value that points to or otherwise indicates) the time interval (e.g., the slot) during which the uplink transmission overlaps with the downlink transmission.

The UE 115-c may receive the uplink indication (e.g., the DCI including the uplink indication) in a downlink control channel search space. For example, the UE 115-c may receive the uplink indication in a PDCCH CSS set, such as a Type3-PDCCH CSS set configured by SearchSpace in PDCCH-Config with searchSpaceType common. The UE 115-c may monitor for the uplink indication based on an identifier (e.g., an RNTI) associated with the uplink indication. Based on receiving the uplink indication, the UE 115-c may determine the resources (e.g., the time or frequency resources) over which the uplink transmission to the base station 105-c overlaps in time with the downlink transmission to the UE 115-c. In some examples, the indication may include a bitmap that indicates a number of symbols during which the uplink transmission overlaps with the downlink transmission. As such, the UE 115-c may determine that the downlink transmission was likely received in a high-interference environment (e.g., due to self-interference or cross-link interference, or both) and may determine a decoding technique for decoding the downlink transmission accordingly. In some examples, however, the UE 115-c may additionally or alternatively use one or more aspects of the downlink transmission to determine a decoding technique for decoding the downlink transmission.

Accordingly, at 520, the base station 105-c may, in some implementations, identify a rate-matching configuration of a set of rate-matching configurations associated with the time or frequency resources over which the uplink transmission overlaps with the downlink communication. In some aspects, the rate-matching configuration may include information pertaining to a portion of the time or frequency resources including rate-matched resources. In some cases, the set of rate-matching configurations may be pre-defined at the UE 115-c. In some examples, the base station 105-c may pre-define the set of rate-matching configurations at the UE 115-c based on control signaling, such as RRC signaling. In some other examples, the UE 115-c may be pre-configured with a set of rate-matching configurations at the UE 115-c (e.g., based on a capability of the UE 115-c).

At 525, the base station 105-c may, in some implementations, transmit, to the UE 115-c, an index value that corresponds to the rate-matching configuration identified at 520. In some examples, the index value may be a bit value or an integer value that the UE 115-c may use to determine which rate-matching configuration of the set of rate-matching configurations is associated with the downlink transmission. In some aspects, the base station 105-c may transmit the index value to the UE 115-c in DCI. In some examples, the base station 105-c may transmit the index value via the same signaling used to convey the uplink indication at 515 (e.g., within the uplink indication).

At 530, the base station 105-c, may in some implementations, identify a portion of the time or frequency resources including punctured resources. At 535, in some implementations, the base station 105-c may transmit, to the UE 115-c, information pertaining to the punctured resources. In some aspects, the information pertaining to the punctured resources may include frequency information associated with the punctured resources, such as a number of REs or a number of RBs that include punctured resources (e.g., a number of punctured REs or a number of punctured RBs). In some examples, the base station 105-c may transmit the information of the punctured resources to the UE 115-c within the uplink indication.

At 540, the UE 115-c may decode the downlink communication (e.g., the downlink transmission). In some implementations, to decode the downlink transmission, the UE 115-c may decode a set of buffered resources that include the downlink transmission. In some examples, the UE 115-c may decode (or select a decoding technique for decoding) the downlink transmission based on determining that the downlink transmission was likely received in a high-interference environment (e.g., in the presence of self-interference or cross-link interference, or both), based on the rate-matching configuration associated with at least a portion of the downlink transmission, based on the portion of the downlink transmission that includes punctured resources, or a combination thereof. Additionally or alternatively, the UE 115-c may decode the downlink transmission based on a PI received from the base station 105-c. In some aspects, the UE 115-c, based on determining that the downlink transmission was likely received in the presence of self-interference or cross-link interference, or both, may determine to apply LLR scaling (e.g., an LLR scaling calculation) on the downlink transmission. As such, the UE 115-c may have a greater likelihood for successfully decoding the downlink transmission compared to if the UE 115-c attempted to decode the downlink transmission without knowledge of the likely presence of interference, the rate-matching configuration, the puncturing information, or the PI, or a combination thereof.

US 12,593,346 B2

33

Figure 6:
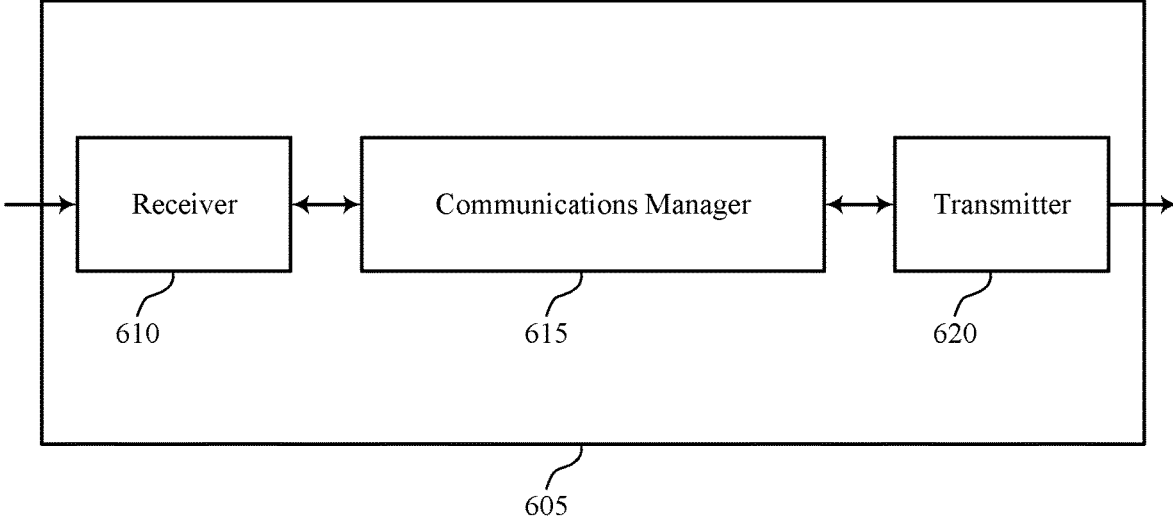
FIGS. 6 and 7 show block diagrams of devices that support uplink indication for full-duplex operation in accordance with aspects of the present disclosure.

FIG. 6 shows a block diagram 600 of a device 605 that supports uplink indication for full-duplex operation in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to uplink indication for full-duplex operation, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify that the UE is operating in a network that supports full-duplex communications, receive, from a base station in the network, an indication of time or frequency resources in which an uplink communication to the base station overlaps in time with a downlink communication to the UE, and decode the downlink communication based on the indication. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and the transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may enable the device 605 to identify whether or not a downlink transmission is received in a high-interference environment. For example, the device 605 may receive, from a base station, an indication (e.g., an uplink indication) of the resources of a downlink transmission to the device 605 that overlaps with an uplink transmission to the base station. Additionally, the base station may provide with device 605 with a number of other aspects associated with the downlink transmission (e.g., rate-matching configuration, puncturing information, PI, among other examples) that may assist the device 605 in decoding the downlink transmission.

Based on techniques for receiving the indication of the resources carrying a downlink transmission that is likely influenced by interference and, in some implementations, the number of other aspects associated with the downlink transmission, the device 605 may determine an appropriate decoding technique for decoding the downlink transmission that may increase the likelihood that the device 605 is able to successfully decode the downlink transmission. Accordingly, the one or more processing units of the device 605 associated with full-duplex communication or receiving downlink transmissions may perform fewer processing operations or computations based on potentially performing fewer decoding attempts or potentially performing fewer operations associated with monitoring reception occasions due to fewer retransmissions of the downlink communication. As such, the one or more processing units of the device 605 may spend longer durations in a sleep mode, which may increase power savings and result in longer battery life of the device 605. Additionally or alternatively, the one or more processing units of the device 605 may perform one or more other processing tasks of the device 605, which may increase the processing efficiency of the device 605.

Figure 7:
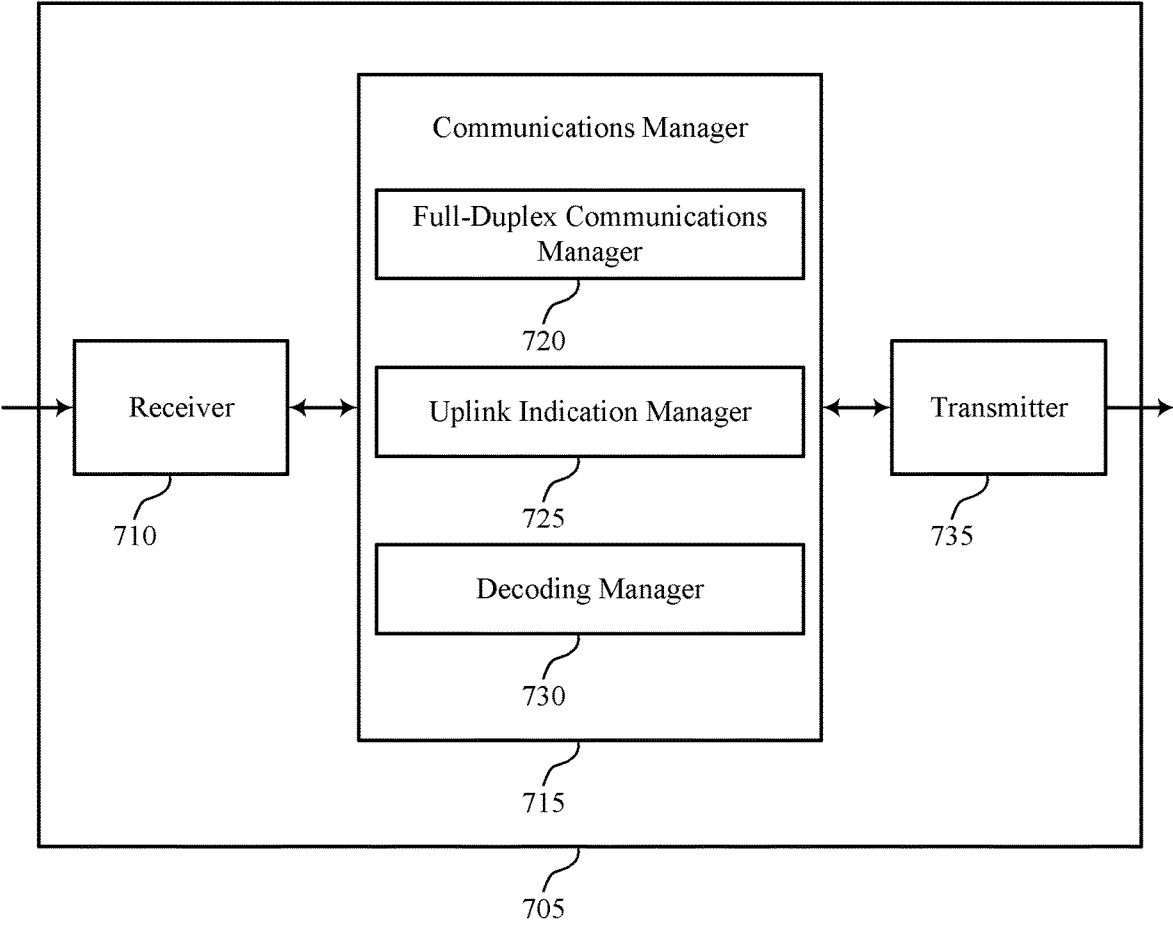

FIG. 7 shows a block diagram 700 of a device 705 that supports uplink indication for full-duplex operation in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to uplink indication for full-duplex operation, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a full-duplex communications manager 720, an uplink indication manager 725, and a decoding manager 730. The communications manager 715 may be an example of aspects of the communications manager 910 described herein.

The full-duplex communications manager 720 may identify that the UE is operating in a network that supports full-duplex communications. The uplink indication manager

725 may receive, from a base station in the network, an indication of time or frequency resources in which an uplink communication to the base station overlaps in time with a downlink communication to the UE. The decoding manager 730 may decode the downlink communication based on the indication.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
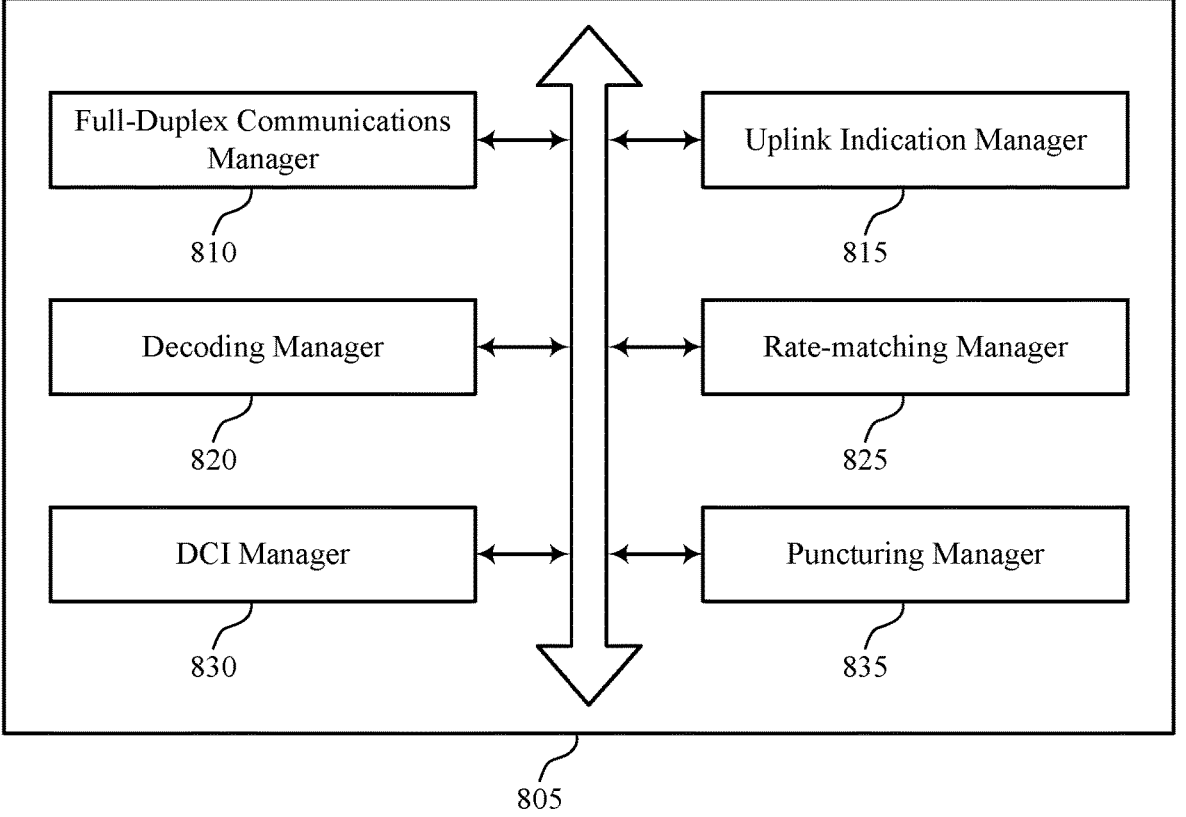
FIG. 8 shows a block diagram of a communications manager that supports uplink indication for full-duplex operation in accordance with aspects of the present disclosure.

FIG. 8 shows a block diagram 800 of a communications manager 805 that supports uplink indication for full-duplex operation in accordance with aspects of the present disclosure. The communications manager 805 may be an example of aspects of a communications manager 615, a communications manager 715, or a communications manager 910 described herein. The communications manager 805 may include a full-duplex communications manager 810, an uplink indication manager 815, a decoding manager 820, a rate-matching manager 825, a DCI manager 830, and a puncturing manager 835. Each of these modules may communicate, directly or indirectly, with one another (e.g., via one or more buses).

The full-duplex communications manager 810 may identify that the UE is operating in a network that supports full-duplex communications. In some cases, the uplink communication includes communication from the UE. In some cases, the uplink communication includes communication from a second UE different from the UE.

The uplink indication manager 815 may receive, from a base station in the network, an indication of time or frequency resources in which an uplink communication to the base station overlaps in time with a downlink communication to the UE. In some examples, the uplink indication manager 815 may determine a number of symbols during which the uplink communication overlaps with the downlink communication based on the indication. In some examples, determining that the indication includes a bitmap, where determining the number of symbols during which the uplink communication overlaps with the downlink communication is based on the bitmap.

In some examples, the uplink indication manager 815 may receive the indication in DCI. In some examples, the uplink indication manager 815 may receive the indication in a downlink control channel search space. In some examples, the uplink indication manager 815 may monitor for the indication based on an identifier associated with the indication. In some cases, the indication includes an index value associated with the first time interval.

The decoding manager 820 may decode the downlink communication based on the indication. In some examples, the decoding manager 820 may decode the downlink communication based on the rate-matching configuration. In some examples, the decoding manager 820 may decode the downlink communication based on the portion of the time or frequency resources including the punctured resources. In some examples, the decoding manager 820 may decode the downlink communication based on an LLR scaling calculation.

The rate-matching manager 825 may identify a rate-matching configuration associated with the time or frequency resources in which the uplink communication overlaps with the downlink communication. In some examples, the rate-matching manager 825 may identify the rate-matching configuration from a set of rate-matching configurations based on the index value. In some examples, the rate-matching manager 825 may identify the set of rate-matching configurations based on RRC signaling.

In some examples, the rate-matching manager 825 may identify a portion of the time or frequency resources including rate-matched resources based on the rate-matching configuration, where decoding the downlink communication is based on the portion of the time or frequency resources including the rate-matched resources. In some cases, the set of rate-matching configurations is preconfigured at the UE.

The DCI manager 830 may receive an index value in DCI. In some examples, the DCI manager 830 may receive the DCI including the indication in a first time interval during which the uplink communication overlaps with the downlink communication. In some examples, the DCI manager 830 may receive the DCI including the indication in a second time interval after a first time interval during which the uplink communication overlaps with the downlink communication.

In some cases, the DCI schedules at least one of the uplink communication and the downlink communication. In some cases, the DCI is a second DCI different than a first DCI that schedules at least one of the uplink communication and the downlink communication.

The puncturing manager 835 may identify a portion of the time or frequency resources including punctured resources based on the indication. In some examples, the puncturing manager 835 may determine frequency information associated with the punctured resources based on the indication. In some examples, the puncturing manager 835 may identify the portion of the time or frequency resources including the punctured resources based on the frequency information. In some cases, the frequency information includes a number of punctured REs or punctured RBs.

Figure 9:
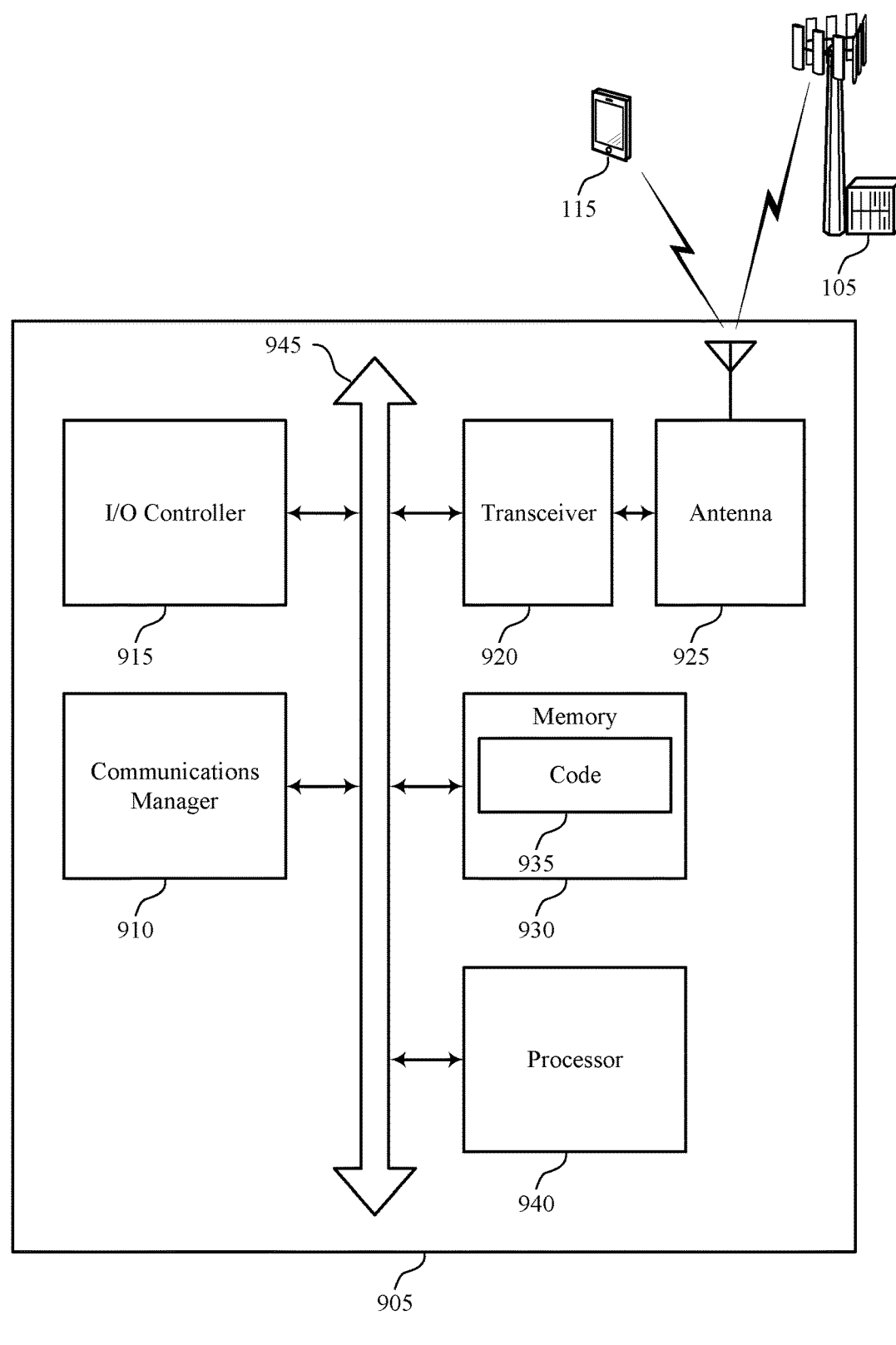
FIG. 9 shows a diagram of a system including a device that supports uplink indication for full-duplex operation in accordance with aspects of the present disclosure.

FIG. 9 shows a diagram of a system 900 including a device 905 that supports uplink indication for full-duplex operation in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify that the UE is operating in a network that supports full-duplex communications, receive, from a base station in the network, an indication of time or frequency resources in which an uplink communication to the base station overlaps in time with a downlink communication to the UE, and decode the downlink communication based on the indication.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting uplink indication for full-duplex operation).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

FIG. 10 shows a block diagram 1000 of a device 1005 that supports uplink indication for full-duplex operation in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink indication for full-duplex operation, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify that the base station is operating in a network that supports full-duplex communications, determine time or frequency resources in which an uplink communication to the base station overlaps in time with a downlink communication to a UE in the network, and transmit, to the UE, an indication of the time or frequency resources. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

As described herein, the device 1005 may transmit an indication (e.g., an uplink indication) to a UE to inform the UE of which resources of a downlink transmission may be affected by self-interference or cross-link interference. The device 1005 may additionally provide information relating to a number of other aspects of the downlink transmission, such as a rate-matching configuration, puncturing information, or a PI, or a combination thereof. Accordingly, the UE may determine a decoding technique based on the information provided by the device 1005, which may increase the likelihood that the UE is able to successfully decode the downlink transmission. As such, the device 1005 may enhance system reliability and robustness while also potentially performing fewer retransmissions of the downlink transmission, which may further reduce overall system congestion and interference. Moreover, based on potentially performing fewer retransmissions of the downlink transmission, the device 1005 may reduce a power draw associated with transmitting to a UE.

Figure 11:
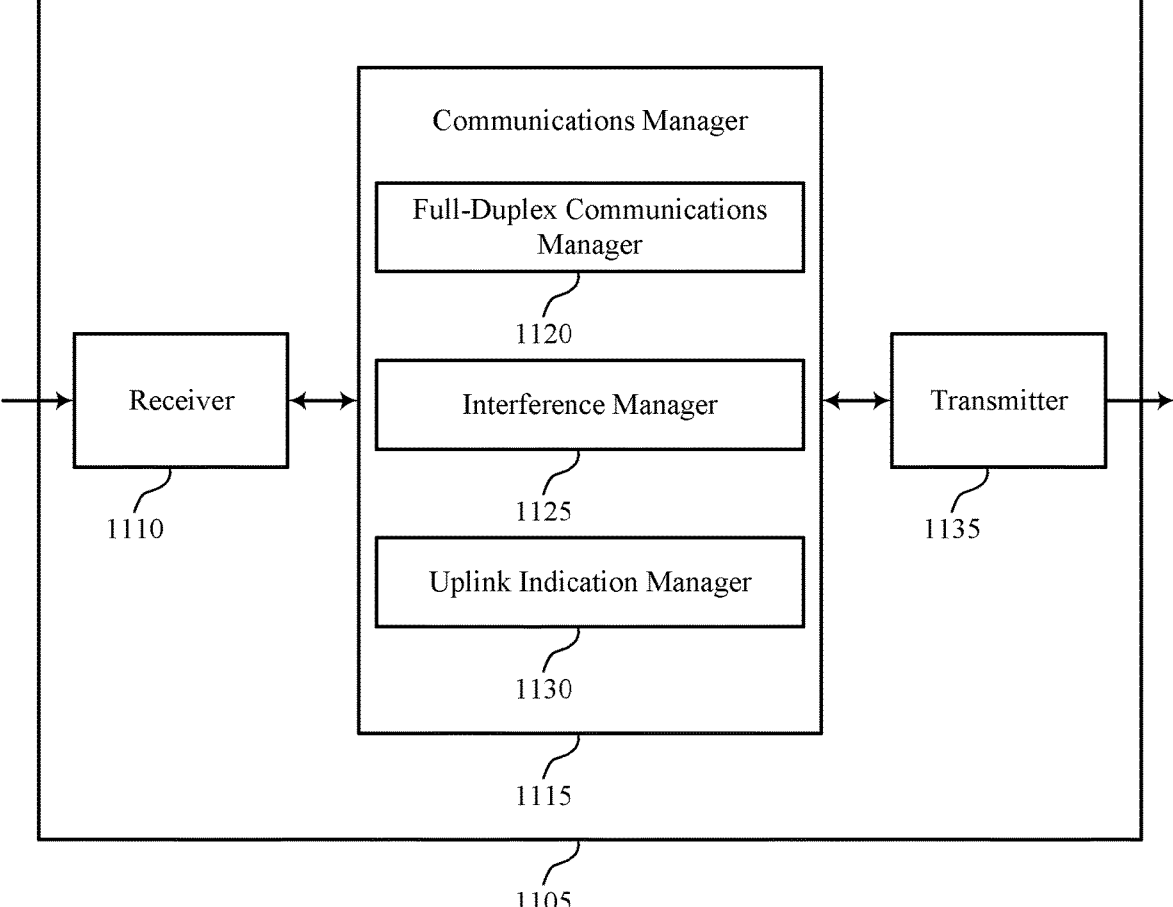

FIG. 11 shows a block diagram 1100 of a device 1105 that supports uplink indication for full-duplex operation in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to uplink indication for full-duplex operation, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a full-duplex communications manager 1120, an interference manager 1125, and an uplink indication manager 1130. The communications manager 1115 may be an example of aspects of the communications manager 1310 described herein.

The full-duplex communications manager 1120 may identify that the base station is operating in a network that supports full-duplex communications. The interference manager 1125 may determine time or frequency resources in which an uplink communication to the base station overlaps in time with a downlink communication to a UE in the network. The uplink indication manager 1130 may transmit, to the UE, an indication of the time or frequency resources.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
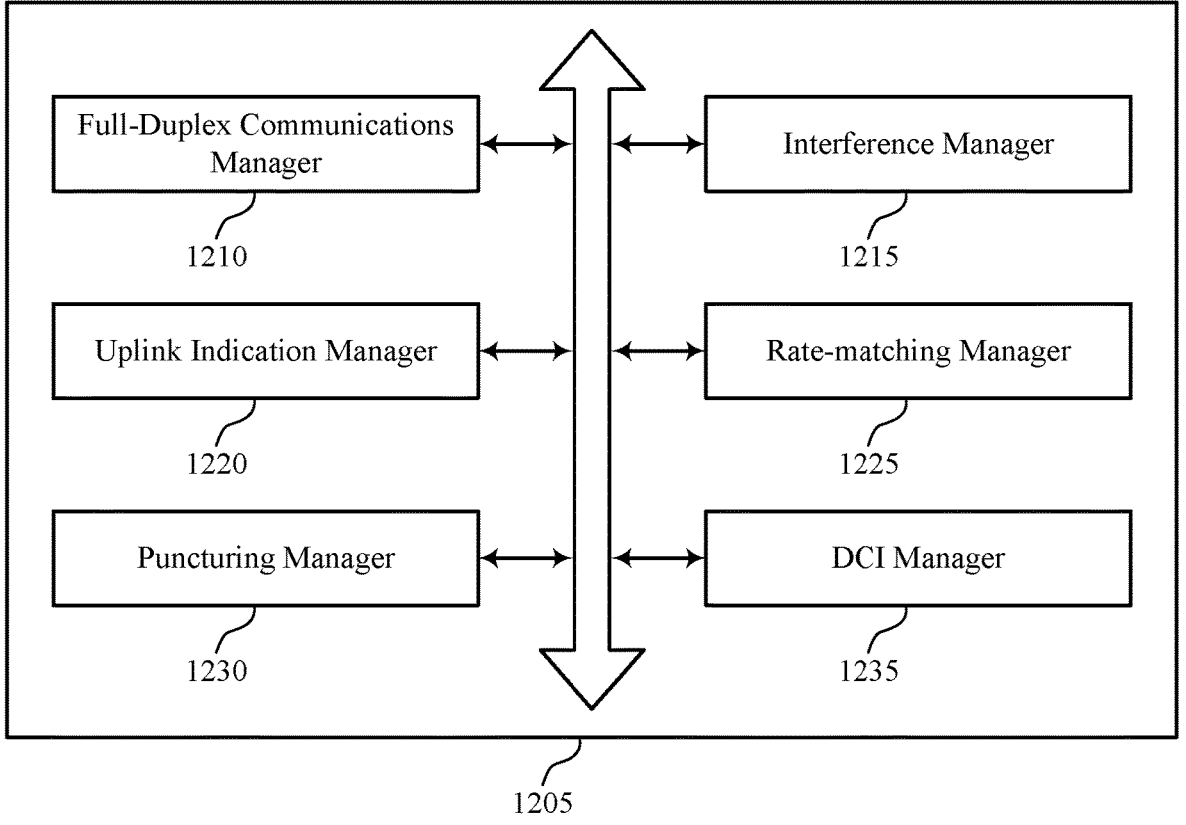
FIG. 12 shows a block diagram of a communications manager that supports uplink indication for full-duplex operation in accordance with aspects of the present disclosure.

FIG. 12 shows a block diagram 1200 of a communications manager 1205 that supports uplink indication for full-duplex operation in accordance with aspects of the present disclosure. The communications manager 1205 may be an example of aspects of a communications manager 1015, a communications manager 1115, or a communications manager 1310 described herein. The communications manager 1205 may include a full-duplex communications manager 1210, an interference manager 1215, an uplink indication manager 1220, a rate-matching manager 1225, a puncturing manager 1230, and a DCI manager 1235. Each of these modules may communicate, directly or indirectly, with one another (e.g., via one or more buses).

The full-duplex communications manager 1210 may identify that the base station is operating in a network that supports full-duplex communications. In some cases, the uplink communication includes communication from the UE. In some cases, the uplink communication includes communication from a second UE different from the UE.

The interference manager 1215 may determine time or frequency resources in which an uplink communication to the base station overlaps in time with a downlink communication to a UE in the network. In some examples, the interference manager 1215 may determine a number of symbols during which the uplink communication overlaps with the downlink communication based on the indication. The uplink indication manager 1220 may transmit, to the UE, an indication of the time or frequency resources.

In some examples, the uplink indication manager 1220 may transmit the indication including a bitmap, where the bitmap is based on the number of symbols during which the uplink communication overlaps with the downlink communication. In some examples, the uplink indication manager 1220 may transmit the indication in DCI. In some examples, the uplink indication manager 1220 may transmit the indication in a downlink control channel search space. In some cases, the indication includes an index value associated with the first time interval.

The rate-matching manager 1225 may identify a rate-matching configuration of a set of rate-matching configurations associated with the time or frequency resources in which the uplink communication overlaps with the downlink communication. In some examples, the rate-matching manager 1225 may transmit, to the UE, an index value in DCI, where the index value corresponds to the rate-matching configuration. In some examples, the rate-matching manager 1225 may transmit, to the UE, RRC signaling, where the RRC signaling includes a second indication indicating the set of rate-matching configurations. In some cases, the rate-matching configuration includes information pertaining to a portion of the time or frequency resources including rate-matched resources.

The puncturing manager 1230 may identify a portion of the time or frequency resources including punctured resources. In some examples, the puncturing manager 1230 may transmit, to the UE, information pertaining to the punctured resources within the indication. In some cases, the information pertaining to the punctured resources includes frequency information associated with the punctured resources. In some cases, the frequency information includes a number of punctured REs or punctured RBs.

The DCI manager 1235 may transmit the DCI including the indication in a first time interval during which the uplink communication overlaps with the downlink communication. In some examples, the DCI manager 1235 may transmit the DCI including the indication in a second time interval after a first time interval during which the uplink communication overlaps with the downlink communication. In some cases, the DCI schedules at least one of the uplink communication and the downlink communication. In some cases, the DCI is a second DCI different than a first DCI that schedules at least one of the uplink communication and the downlink communication.

Figure 13:
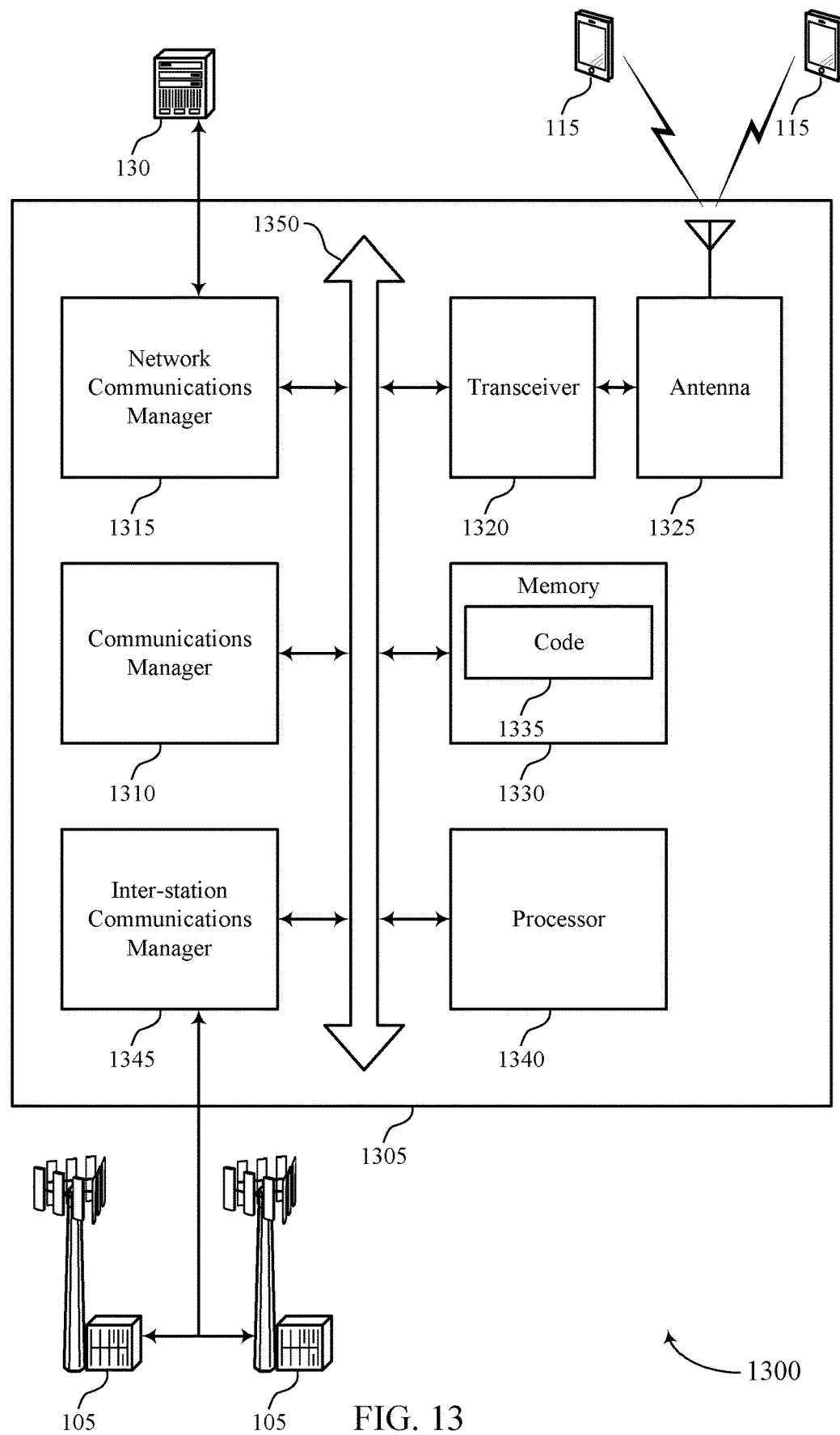
FIG. 13 shows a diagram of a system including a device that supports uplink indication for full-duplex operation in accordance with aspects of the present disclosure.

FIG. 13 shows a diagram of a system 1300 including a device 1305 that supports uplink indication for full-duplex operation in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify that the base station is operating in a network that supports full-duplex communications, determine time or frequency resources in which an uplink communication to the base station overlaps in time with a downlink communication to a UE in the network, and transmit, to the UE, an indication of the time or frequency resources.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting uplink indication for full-duplex operation).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
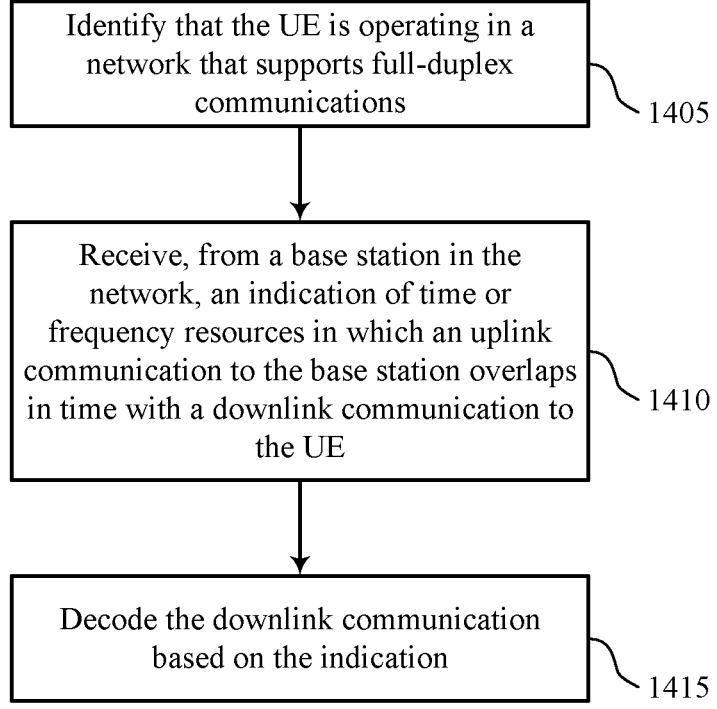

FIG. 14 shows a flowchart illustrating a method 1400 that supports uplink indication for full-duplex operation in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may identify that the UE is operating in a network that supports full-duplex communications. The operations of 1405 may be performed according to the methods described herein. In some examples, aspects of the operations of 1405 may be performed by a full-duplex communications manager as described with reference to FIGS. 6 through 9.

At 1410, the UE may receive, from a base station in the network, an indication of time or frequency resources in which an uplink communication to the base station overlaps in time with a downlink communication to the UE. The operations of 1410 may be performed according to the methods described herein. In some examples, aspects of the operations of 1410 may be performed by an uplink indication manager as described with reference to FIGS. 6 through 9.

At 1415, the UE may decode the downlink communication based on the indication. The operations of 1415 may be performed according to the methods described herein. In some examples, aspects of the operations of 1415 may be performed by a decoding manager as described with reference to FIGS. 6 through 9.

FIG. 15 shows a flowchart illustrating a method 1500 that supports uplink indication for full-duplex operation in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may identify that the UE is operating in a network that supports full-duplex communications. The operations of 1505 may be performed according to the methods described herein. In some examples, aspects of the operations of 1505 may be performed by a full-duplex communications manager as described with reference to FIGS. 6 through 9.

At 1510, the UE may receive, from a base station in the network, an indication of time or frequency resources in which an uplink communication to the base station overlaps in time with a downlink communication to the UE. The operations of 1510 may be performed according to the methods described herein. In some examples, aspects of the operations of 1510 may be performed by an uplink indication manager as described with reference to FIGS. 6 through 9.

At 1515, the UE may determine a number of symbols during which the uplink communication overlaps with the downlink communication based on the indication. The operations of 1515 may be performed according to the methods described herein. In some examples, aspects of the operations of 1515 may be performed by an uplink indication manager as described with reference to FIGS. 6 through 9.

At 1520, the UE may decode the downlink communication based on the indication. The operations of 1520 may be performed according to the methods described herein. In some examples, aspects of the operations of 1520 may be performed by a decoding manager as described with reference to FIGS. 6 through 9.

FIG. 16 shows a flowchart illustrating a method 1600 that supports uplink indication for full-duplex operation in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may identify that the UE is operating in a network that supports full-duplex communications. The operations of 1605 may be performed according to the methods described herein. In some examples, aspects of the operations of 1605 may be performed by a full-duplex communications manager as described with reference to FIGS. 6 through 9.

At 1610, the UE may receive, from a base station in the network, an indication of time or frequency resources in which an uplink communication to the base station overlaps in time with a downlink communication to the UE. The operations of 1610 may be performed according to the methods described herein. In some examples, aspects of the operations of 1610 may be performed by an uplink indication manager as described with reference to FIGS. 6 through 9.

At 1615, the UE may identify a rate-matching configuration associated with the time or frequency resources in which the uplink communication overlaps with the downlink communication. The operations of 1615 may be performed according to the methods described herein. In some examples, aspects of the operations of 1615 may be performed by a rate-matching manager as described with reference to FIGS. 6 through 9.

At 1620, the UE may decode the downlink communication based on the indication and the rate-matching configuration. The operations of 1620 may be performed according to the methods described herein. In some examples, aspects of the operations of 1620 may be performed by a decoding manager as described with reference to FIGS. 6 through 9.

FIG. 17 shows a flowchart illustrating a method 1700 that supports uplink indication for full-duplex operation in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may identify that the UE is operating in a network that supports full-duplex communications. The operations of 1705 may be performed according to the methods described herein. In some examples, aspects of the operations of 1705 may be performed by a full-duplex communications manager as described with reference to FIGS. 6 through 9.

At 1710, the UE may receive, from a base station in the network, an indication of time or frequency resources in which an uplink communication to the base station overlaps in time with a downlink communication to the UE. The operations of 1710 may be performed according to the methods described herein. In some examples, aspects of the operations of 1710 may be performed by an uplink indication manager as described with reference to FIGS. 6 through 9.

At 1715, the UE may identify a portion of the time or frequency resources including punctured resources based on the indication. The operations of 1715 may be performed according to the methods described herein. In some examples, aspects of the operations of 1715 may be performed by a puncturing manager as described with reference to FIGS. 6 through 9.

At 1720, the UE may decode the downlink communication based on the indication and on the portion of the time or frequency resources including punctured resources. The operations of 1720 may be performed according to the methods described herein. In some examples, aspects of the operations of 1720 may be performed by a decoding manager as described with reference to FIGS. 6 through 9.

Figure 18:
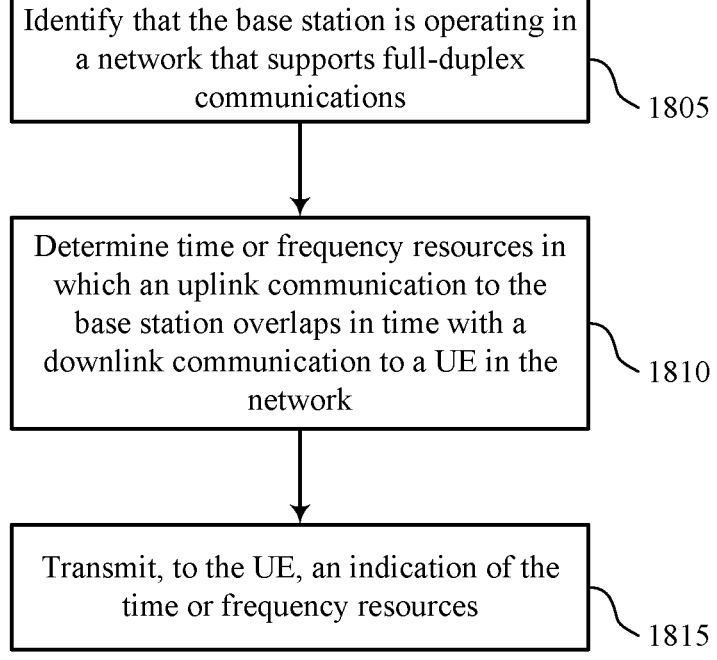

FIG. 18 shows a flowchart illustrating a method 1800 that supports uplink indication for full-duplex operation in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may identify that the base station is operating in a network that supports full-duplex communications. The operations of 1805 may be performed according to the methods described herein. In some examples, aspects of the operations of 1805 may be performed by a full-duplex communications manager as described with reference to FIGS. 10 through 13.

At 1810, the base station may determine time or frequency resources in which an uplink communication to the base station overlaps in time with a downlink communication to a UE in the network. The operations of 1810 may be performed according to the methods described herein. In some examples, aspects of the operations of 1810 may be performed by an interference manager as described with reference to FIGS. 10 through 13.

At 1815, the base station may transmit, to the UE, an indication of the time or frequency resources. The operations of 1815 may be performed according to the methods described herein. In some examples, aspects of the operations of 1815 may be performed by an uplink indication manager as described with reference to FIGS. 10 through 13.

FIG. 19 shows a flowchart illustrating a method 1900 that supports uplink indication for full-duplex operation in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may identify that the base station is operating in a network that supports full-duplex communications. The operations of 1905 may be performed according to the methods described herein. In some examples, aspects of the operations of 1905 may be performed by a full-duplex communications manager as described with reference to FIGS. 10 through 13.

At 1910, the base station may determine time or frequency resources in which an uplink communication to the base station overlaps in time with a downlink communication to a UE in the network. The operations of 1910 may be performed according to the methods described herein. In some examples, aspects of the operations of 1910 may be performed by an interference manager as described with reference to FIGS. 10 through 13.

At 1915, the base station may determine a number of symbols during which the uplink communication overlaps with the downlink communication based on the indication. The operations of 1915 may be performed according to the methods described herein. In some examples, aspects of the operations of 1915 may be performed by an interference manager as described with reference to FIGS. 10 through 13.

At 1920, the base station may transmit, to the UE, an indication of the time or frequency resources. The operations of 1920 may be performed according to the methods described herein. In some examples, aspects of the operations of 1920 may be performed by an uplink indication manager as described with reference to FIGS. 10 through 13.

FIG. 20 shows a flowchart illustrating a method 2000 that supports uplink indication for full-duplex operation in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2005, the base station may identify that the base station is operating in a network that supports full-duplex communications. The operations of 2005 may be performed according to the methods described herein. In some examples, aspects of the operations of 2005 may be performed by a full-duplex communications manager as described with reference to FIGS. 10 through 13.

At 2010, the base station may determine time or frequency resources in which an uplink communication to the base station overlaps in time with a downlink communication to a UE in the network. The operations of 2010 may be performed according to the methods described herein. In some examples, aspects of the operations of 2010 may be performed by an interference manager as described with reference to FIGS. 10 through 13.

At 2015, the base station may identify a rate-matching configuration of a set of rate-matching configurations associated with the time or frequency resources in which the uplink communication overlaps with the downlink communication. The operations of 2015 may be performed according to the methods described herein. In some examples, aspects of the operations of 2015 may be performed by a rate-matching manager as described with reference to FIGS. 10 through 13.

At 2020, the base station may transmit, to the UE, an indication of the time or frequency resources. The operations of 2020 may be performed according to the methods described herein. In some examples, aspects of the operations of 2020 may be performed by an uplink indication manager as described with reference to FIGS. 10 through 13.

At 2025, the base station may transmit, to the UE, an index value in DCI, where the index value corresponds to the rate-matching configuration. The operations of 2025 may be performed according to the methods described herein. In some examples, aspects of the operations of 2025 may be performed by a rate-matching manager as described with reference to FIGS. 10 through 13.

FIG. 21 shows a flowchart illustrating a method 2100 that supports uplink indication for full-duplex operation in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2105, the base station may identify that the base station is operating in a network that supports full-duplex communications. The operations of 2105 may be performed according to the methods described herein. In some examples, aspects of the operations of 2105 may be performed by a full-duplex communications manager as described with reference to FIGS. 10 through 13.

At 2110, the base station may determine time or frequency resources in which an uplink communication to the base station overlaps in time with a downlink communication to a UE in the network. The operations of 2110 may be performed according to the methods described herein. In some examples, aspects of the operations of 2110 may be performed by an interference manager as described with reference to FIGS. 10 through 13.

At 2115, the base station may identify a portion of the time or frequency resources including punctured resources. The operations of 2115 may be performed according to the methods described herein. In some examples, aspects of the operations of 2115 may be performed by a puncturing manager as described with reference to FIGS. 10 through 13.

At 2120, the base station may transmit, to the UE, an indication of the time or frequency resources. The operations of 2120 may be performed according to the methods described herein. In some examples, aspects of the operations of 2120 may be performed by an uplink indication manager as described with reference to FIGS. 10 through 13.

At 2125, the base station may transmit, to the UE, information pertaining to the punctured resources within the indication. The operations of 2125 may be performed according to the methods described herein. In some examples, aspects of the operations of 2125 may be performed by a puncturing manager as described with reference to FIGS. 10 through 13.

The following examples are given by way of illustration. Aspects of the following examples may be combined with aspects or embodiments shown or discussed in relation to the figures or elsewhere herein.

Aspect 1 is a method for wireless communications at a UE, comprising: identifying that the UE is operating in a network that supports full-duplex communications, receiving, from a base station in the network, an indication of time or frequency resources in which an uplink communication to the base station overlaps in time with a downlink communication to the UE; and decoding the downlink communication based at least in part on the indication.

In aspect 2, the method of aspect 1, further comprising: determining a number of symbols during which the uplink communication overlaps with the downlink communication based at least in part on the indication.

In aspect 3, the method of aspect 2, further comprising: determining that the indication includes a bitmap, wherein determining the number of symbols during which the uplink communication overlaps with the downlink communication is based at least in part on the bitmap.

In aspect 4, the method of any of aspects 1-3, further comprising: identifying a rate-matching configuration associated with the time or frequency resources in which the uplink communication overlaps with the downlink communication; and decoding the downlink communication based at least in part on the rate-matching configuration.

In aspect 5, wherein identifying the rate-matching configuration of aspect 4 further comprises: receiving an index value in DCI; and identifying the rate-matching configuration from a plurality of rate-matching configurations based at least in part on the index value.

In aspect 6, the method of aspect 5, further comprising: identifying the plurality of rate-matching configurations based at least in part on RRC signaling.

In aspect 7, wherein the plurality of rate-matching configurations of any of aspects 5 or 6 is preconfigured at the UE.

In aspect 8, the method of any of aspects 4-7, further comprising: identifying a portion of the time or frequency resources including rate-matched resources based at least in part on the rate-matching configuration, wherein decoding the downlink communication is based at least in part on the portion of the time or frequency resources including the rate-matched resources.

In aspect 9, the method of any of aspects 1-8, further comprising: identifying a portion of the time or frequency resources including punctured resources based at least in part on the indication; and decoding the downlink communication based at least in part on the portion of the time or frequency resources including the punctured resources.

In aspect 10, wherein identifying the portion of the time or frequency resources including the punctured resources of aspect 9 further comprises: determining frequency information associated with the punctured resources based at least in part on the indication; and identifying the portion of the time or frequency resources including the punctured resources based at least in part on the frequency information.

In aspect 11, wherein the frequency information of aspect 10 comprises a number of punctured REs or punctured RBs.

In aspect 12, the method of any of aspects 1-11, further comprising: receiving the indication in DCI.

In aspect 13, the method of aspect 12, further comprising: receiving the DCI including the indication in a first time interval during which the uplink communication overlaps with the downlink communication.

In aspect 14, wherein the DCI of any of aspects 12 or 13 schedules at least one of the uplink communication and the downlink communication.

In aspect 15, wherein the DCI of any of aspects 12 or 13 is a second DCI different than a first DCI that schedules at least one of the uplink communication and the downlink communication.

In aspect 16, the method of aspect 12, further comprising: receiving the DCI including the indication in a second time interval after a first time interval during which the uplink communication overlaps with the downlink communication.

In aspect 17, wherein the indication of aspect 16 comprises an index value associated with the first time interval.

In aspect 18, the method of any of aspects 1-17, further comprising: receiving the indication in a downlink control channel search space.

In aspect 19, the method of aspect 18, further comprising: monitoring for the indication based at least in part on an identifier associated with the indication.

In aspect 20, wherein the uplink communication of any of aspects 1-19 comprises communication from the UE.

In aspect 21, wherein the uplink communication of any of aspects 1-19 comprises communication from a second UE different from the UE.

In aspect 22, wherein the method of any of aspects 1-21 comprises decoding the downlink communication based at least in part on an LLR scaling calculation.

Aspect 23 is a method for wireless communications at a base station, comprising: identifying that the base station is operating in a network that supports full-duplex communications, determining time or frequency resources in which an uplink communication to the base station overlaps in time with a downlink communication to a UE in the network; and transmitting, to the UE, an indication of the time or frequency resources.

In aspect 24, the method of aspect 23, further comprising: determining a number of symbols during which the uplink communication overlaps with the downlink communication based at least in part on the indication.

In aspect 25, the method of aspect 24, further comprising: transmitting the indication including a bitmap, wherein the bitmap is based at least in part on the number of symbols during which the uplink communication overlaps with the downlink communication.

In aspect 26, the method of any of aspects 23-25, further comprising: identifying a rate-matching configuration of a plurality of rate-matching configurations associated with the time or frequency resources in which the uplink communication overlaps with the downlink communication; and transmitting, to the UE, an index value in DCI, wherein the index value corresponds to the rate-matching configuration.

In aspect 27, the method of aspect 26, further comprising: transmitting, to the UE, RRC signaling, wherein the RRC signaling includes a second indication indicating the plurality of rate-matching configurations.

In aspect 28, wherein the rate-matching configuration of any of aspects 26 or 27 comprises information pertaining to a portion of the time or frequency resources including rate-matched resources.

In aspect 29, the method of any of aspects 23-28, further comprising: identifying a portion of the time or frequency resources comprising punctured resources; and transmitting, to the UE, information pertaining to the punctured resources within the indication.

In aspect 30, wherein the information pertaining to the punctured resources of aspect 29 comprises frequency information associated with the punctured resources.

In aspect 31, wherein the frequency information of aspect 30 comprises a number of punctured REs or punctured RBs.

In aspect 32, the method of any of aspects 23-31, further comprising: transmitting the indication in DCI.

In aspect 33, the method of aspect 32, further comprising: transmitting the DCI including the indication in a first time interval during which the uplink communication overlaps with the downlink communication.

In aspect 34, wherein the DCI of any of aspects 32 or 33 schedules at least one of the uplink communication and the downlink communication.

In aspect 35, wherein the DCI of any of aspects 32 or 33 is a second DCI different than a first DCI that schedules at least one of the uplink communication and the downlink communication.

In aspect 36, the method of aspect 32, further comprising: transmitting the DCI including the indication in a second time interval after a first time interval during which the uplink communication overlaps with the downlink communication.

In aspect 37, wherein the indication of aspect 36 comprises an index value associated with the first time interval.

In aspect 38, the method of any of aspects 23-37, further comprising: transmitting the indication in a downlink control channel search space.

In aspect 39, wherein the uplink communication of any of aspects 23-38 comprises communication from the UE.

In aspect 40, wherein the uplink communication of any of aspects 23-38 comprises communication from a second UE different from the UE.

Aspect 41 is an apparatus for wireless communication, comprising: a processor, memory coupled with the processor, and instructions stored in the memory and executable by the processor to cause the apparatus to perform a method of any of aspects 1-22.

Aspect 42 is an apparatus for wireless communications, comprising: at least one means for performing a method of any of aspects 1-22.

Aspect 43 is a non-transitory computer-readable medium storing code for wireless communications at a UE, the code including instructions executable by a processor to perform a method of any of aspects 1-22.

Aspect 44 is an apparatus for wireless communication, comprising: a processor, memory coupled with the processor, and instructions stored in the memory and executable by the processor to cause the apparatus to perform a method of any of aspects 23-40.

Aspect 45 is an apparatus for wireless communications, comprising: at least one means for performing a method of any of aspects 23-40.

Aspect 46 is a non-transitory computer-readable medium storing code for wireless communications at a base station, the code including instructions executable by a processor to perform a method of any of aspects 23-40.

Aspects of these examples may be combined with aspects or embodiments disclosed in other implementations.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
identifying that the UE is operating in a network that supports full-duplex communications;
storing, at a buffer of the UE, a downlink communication received by the UE during full-duplex operation, the downlink communication received over time or frequency resources;
receiving, from a network entity in the network and after storing the downlink communication at the buffer of the UE, an indication of a portion of the time or frequency resources in which an uplink communication to the network entity overlaps in time with the downlink communication, wherein the uplink communication and the downlink communication are scheduled via separate downlink control information messages;
determining a quantity of symbols during which the uplink communication overlaps with the downlink communication based at least in part on the indication; and
decoding the downlink communication stored at the buffer based at least in part on receipt of the indication of the portion of the time or frequency resources and the quantity of symbols during which the uplink communication overlaps with the downlink communication.

2. The method of claim 1, further comprising:
determining that the indication comprises a bitmap, wherein determining the quantity of symbols during which the uplink communication overlaps with the downlink communication is based at least in part on the bitmap.

3. The method of claim 1, further comprising:
identifying a rate-matching configuration associated with the portion of the time or frequency resources in which the uplink communication overlaps with the downlink communication; and
decoding the downlink communication based at least in part on the rate-matching configuration.

4. The method of claim 3, wherein identifying the rate-matching configuration further comprises:
receiving an index value in downlink control information; and
identifying the rate-matching configuration from a plurality of rate-matching configurations based at least in part on the index value.

5. The method of claim 4, further comprising:
identifying the plurality of rate-matching configurations based at least in part on radio resource control signaling.

6. The method of claim 4, wherein the plurality of rate-matching configurations is preconfigured at the UE.

7. The method of claim 3, further comprising:
identifying a second portion of the time or frequency resources comprising rate-matched resources based at least in part on the rate-matching configuration, wherein decoding the downlink communication is based at least in part on the second portion of the time or frequency resources comprising the rate-matched resources.

8. The method of claim 1, further comprising:
identifying a second portion of the time or frequency resources comprising punctured resources based at least in part on the indication; and
decoding the downlink communication based at least in part on the second portion of the time or frequency resources comprising the punctured resources.

9. The method of claim 8, wherein identifying the second portion of the time or frequency resources comprising the punctured resources further comprises:
determining frequency information associated with the punctured resources based at least in part on the indication; and
identifying the second portion of the time or frequency resources comprising the punctured resources based at least in part on the frequency information.

10. The method of claim 1, wherein the frequency information comprises a quantity of punctured resource elements or punctured resource blocks.

11. The method of claim 1, further comprising:
receiving a first downlink control information comprising the indication in a first time interval during which the uplink communication overlaps with the downlink communication.

12. The method of claim 11, wherein the first downlink control information schedules one of the uplink communication or the downlink communication.

13. The method of claim 11, wherein the first downlink control information is different than a second downlink control information that schedules one of the uplink communication or the downlink communication.

14. The method of claim 1, further comprising:

receiving downlink control information comprising the indication in a second time interval after a first time interval during which the uplink communication overlaps with the downlink communication.

15. The method of claim 14, wherein the indication comprises an index value associated with the first time interval.

16. The method of claim 1, further comprising:

monitoring for the indication based at least in part on an identifier associated with the indication.

17. A user equipment (UE) for wireless communication, comprising:

one or more processors;

memory coupled with the one or more processors; and instructions stored in the memory and executable by the one or more processors to cause the UE to:

identify that the UE is operating in a network that supports full-duplex communications;

store, at a buffer of the UE, a downlink communication received by the UE based during full-duplex operation, the downlink communication received over time or frequency resources;

receive, from a network entity in the network and after storing the downlink communication at the buffer of the UE, an indication of a portion of the time or frequency resources in which an uplink communication to the network entity overlaps in time with the downlink communication, wherein the uplink communication and the downlink communication are scheduled via separate downlink control information messages;

determine a quantity of symbols during which the uplink communication overlaps with the downlink communication based at least in part on the indication; and decode the downlink communication stored at the buffer based at least in part on receipt of the indication of the portion of the time or frequency resources and the quantity of symbols during which the uplink communication overlaps with the downlink communication.

18. The UE of claim 17, wherein the instructions are further executable by the one or more processors to cause the UE to:

determine that the indication comprises a bitmap, wherein determining the quantity of symbols during which the uplink communication overlaps with the downlink communication is based at least in part on the bitmap.

19. The UE of claim 17, wherein the instructions are further executable by the one or more processors to cause the UE to:

identify a rate-matching configuration associated with the portion of the time or frequency resources in which the uplink communication overlaps with the downlink communication; and decode the downlink communication based at least in part on the rate-matching configuration.

20. The UE of claim 19, wherein the instructions to identify the rate-matching configuration further are executable by the one or more processors to cause the UE to:

receive an index value in downlink control information; and identify the rate-matching configuration from a plurality of rate-matching configurations based at least in part on the index value.

21. The UE of claim 20, wherein the instructions are further executable by the one or more processors to cause the UE to:

identify the plurality of rate-matching configurations based at least in part on radio resource control signaling.

22. The UE of claim 20, wherein the plurality of rate-matching configurations is preconfigured at the UE.

23. The UE of claim 19, wherein the instructions are further executable by the one or more processors to cause the UE to:

identify a second portion of the time or frequency resources comprising rate-matched resources based at least in part on the rate-matching configuration, wherein decoding the downlink communication is based at least in part on the second portion of the time or frequency resources comprising the rate-matched resources.

24. The UE of claim 17, wherein the instructions are further executable by the one or more processors to cause the UE to:

identify a second portion of the time or frequency resources comprising punctured resources based at least in part on the indication; and decode the downlink communication based at least in part on the second portion of the time or frequency resources comprising the punctured resources.

25. The UE of claim 24, wherein the instructions to identify the second portion of the time or frequency resources comprising the punctured resources are further executable by the one or more processors to cause the UE to:

determine frequency information associated with the punctured resources based at least in part on the indication; and identify the second portion of the time or frequency resources comprising the punctured resources based at least in part on the frequency information.

26. The UE of claim 2, wherein the frequency information comprises a quantity of punctured resource elements or punctured resource blocks.

27. A user equipment (UE) for wireless communication, comprising:

means for identifying that the UE is operating in a network that supports full-duplex communications;

means for storing, at a buffer of the UE, a downlink communication received by the UE during full-duplex operation, the downlink communication received over time or frequency resources;

means for receiving, from a network entity in the network and after storing the downlink communication at the buffer of the UE, an indication of a portion of the time or frequency resources in which an uplink communication to the network entity overlaps in time with the downlink communication, wherein the uplink communication and the downlink communication are scheduled via separate downlink control information messages;

means for determining a quantity of symbols during which the uplink communication overlaps with the downlink communication based at least in part on the indication; and means for decoding the downlink communication stored at the buffer based at least in part on receipt of the indication of the portion of the time or frequency resources and the quantity of symbols during which the uplink communication overlaps with the downlink communication.

28. A non-transitory computer-readable medium storing code for wireless communication at a user equipment (UE), the code comprising instructions executable by a processor to:

identify that the UE is operating in a network that supports full-duplex communications;

store, at a buffer of the UE, a downlink communication received by the UE during full-duplex operation, the downlink communication received over time or frequency resources;

receive, from a network entity in the network and after storing the downlink communication at the buffer of the UE, an indication of a portion of the time or frequency resources in which an uplink communication to the network entity overlaps in time with the downlink communication, wherein the uplink communication and the downlink communication are scheduled via separate downlink control information messages;

determining a quantity of symbols during which the uplink communication overlaps with the downlink communication based at least in part on the indication; and decode the downlink communication stored at the buffer based at least in part on receipt of the indication of the portion of the time or frequency resources and the quantity of symbols during which the uplink communication overlaps with the downlink communication.

\*    \*    \*    \*    \*